(12) United States Patent
Kano et al.

(10) Patent No.: US 11,807,840 B2
(45) Date of Patent: Nov. 7, 2023

(54) ULTRASONIC VIBRATION IMPARTING DEVICE

(71) Applicant: TOPPAN PRINTING CO., LTD., Tokyo (JP)

(72) Inventors: Hiroaki Kano, Tokyo (JP); Kotaro Kawano, Tokyo (JP); Masaaki Murakami, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 811 days.

(21) Appl. No.: 16/746,487

(22) Filed: Jan. 17, 2020

(65) Prior Publication Data

US 2020/0148986 A1    May 14, 2020

Related U.S. Application Data

(63) Continuation-in-part of application No. PCT/JP2018/027103, filed on Jul. 19, 2018.

(30) Foreign Application Priority Data

Jul. 21, 2017  (JP) .................................. 2017-141946
Aug. 29, 2019  (JP) .................................. 2019-157161

(51) Int. Cl.
   *C12H 1/16*    (2006.01)
   *B65D 1/16*    (2006.01)

(52) U.S. Cl.
   CPC ............... *C12H 1/16* (2013.01); *B65D 1/165* (2013.01)

(58) Field of Classification Search
   CPC .......... B01F 31/86; B01F 31/861; C12H 1/16; B65D 17/0607; B65D 25/20
   See application file for complete search history.

(56) References Cited

U.S. PATENT DOCUMENTS

2010/0008178 A1*  1/2010  Fahrion ................... B01F 31/86
                                                      366/127

FOREIGN PATENT DOCUMENTS

| JP | 2012-144258 A | 8/2012 |
| JP | 6546360 B1 | 7/2019 |
| WO | WO 2019/017434 A1 | 1/2019 |

OTHER PUBLICATIONS

International Search Report and Written Opinion for PCT Application No. PCT/JP2018/027103, with Translation, Search Report dated Oct. 23, 2018, 17 pages.

* cited by examiner

*Primary Examiner* — Andrew T Kirsch
(74) *Attorney, Agent, or Firm* — Squire Patton Boggs (US) LLP

(57) ABSTRACT

This ultrasonic-wave vibration imparting device is configured so as to be attachable to a container that retains a beverage and that has a spout on an upper part thereof. The ultrasonic-wave vibration imparting device includes: an annular engagement part configured so as to engage with the upper part of the container; and an ultrasonic wave generating unit configured so as to be disposed at a position at which the unit comes into contact with a side surface of the container below the spout, as a result of the engagement between the container and the engagement part.

14 Claims, 17 Drawing Sheets

ULTRASONIC VIBRATION IMPARTING DEVICE

CROSS-REFERENCE

This application is a Continuation-in-Part filing of International Application No. PCT/JP2018/027103 filed on Jul. 19, 2018, which claims priority to Japanese Application No. 2017-141946 filed on Jul. 21, 2017. This application also claims priority to 2019-157161, filed on Aug. 29, 2019. All three applications are incorporated verbatim herein by reference in their entirety, including the specifications, drawings, and the claims.

TECHNICAL FIELD

The present invention relates to an ultrasonic vibration applying device used for applying ultrasonic vibration to beverage.

BACKGROUND ART

A known device generates foam in a sparkling beverage such as beer in order to limit degradation in taste and improve the mouthfeel. Patent Document 1 describes a foaming device mounted on an upper lid part of a beverage can containing a sparkling beverage. The foaming device includes a passage through which the sparkling beverage flows. The foaming device further includes an ultrasonic generation device arranged to be capable of applying ultrasonics to the sparkling beverage that flows through the passage. When a user tilts the beverage can, the sparkling beverage flows out of the spout of the beverage can. Then, the sparkling beverage flows through the passage in the foaming device to the outside and pours into a cup such as a glass. At the point in time at which a suitable amount of the sparkling beverage is poured into the cup, activating the ultrasonic generation device causes the sparkling beverage flowing through the passage to be foamed through ultrasonic vibration. The foam is then poured into the cup. As a result, the foam is on the sparkling beverage, which is liquid, in the cup.

PRIOR ART DOCUMENTS

Patent Documents

Patent Document 1: Japanese Laid-Open Patent Publication No. 2012-144258

SUMMARY OF THE INVENTION

Problems that the Invention is to Solve

During use of the foaming device described in Patent Document 1, a sparkling beverage flows through the passage in the device as described above. Thus, in order to manage the foaming device, the device needs to be cleaned for every use. This increases the burden on the management of the foaming device.

The above-described problem is not limited to a device that foams a sparkling beverage but is common to devices that apply ultrasonic vibration to beverage for various purposes.

It is an objective of the present invention to provide an ultrasonic vibration applying device capable of reducing the burden on the management.

Means for Solving the Problems

An ultrasonic vibration applying device that solves the above-described problem is configured to be mounted on a container that contains beverage and includes a spout at an upper part of the container. The ultrasonic vibration applying device includes an annular fitted portion configured to be fitted to the upper part of the container and an ultrasonic generator configured to be arranged at a position in contact with a side surface of the container on a lower side of the spout by fitting the container and the fitted portion to each other.

In the above-described configuration, when beverage is poured into a glass or the like from the container on which the ultrasonic vibration applying device is mounted, the ultrasonics generated by the ultrasonic generator are transmitted from the side surface of the container to beverage in the container. Thus, the beverage is foamed in the container without contacting the ultrasonic vibration applying device and poured out of the spout. This reduces the need to clean the ultrasonic vibration applying device for every use and thus reduces the burden on the management of the ultrasonic vibration applying device.

In the above-described configuration, the container may be a beverage can, and the fitted portion may have a shape that allows to be fitted to the beverage can.

In the above-described configuration, when a user drinks beverage can contained in a commercially available beverage can, the user can use the ultrasonic vibration applying device by mounting the ultrasonic vibration applying device on the beverage can. Thus, as compared to when, for example, a dedicated container is required for the use of the ultrasonic vibration applying device, the ultrasonic vibration applying device is highly versatile and the convenience for the user is improved.

In the above-described configuration, the fitted portion may include an upper end fitted portion having a shape that allows to be fitted to a recess of the beverage can, the recess being recessed from an upper end of the beverage can toward an inner side of the beverage can.

In the above-described configuration, the stability of the position of the ultrasonic vibration applying device relative to the container can be improved by fitting the fitted portion to the container such that the upper end fitted portion and the recess are fitted to each other. Further, the fitting of the upper end fitted portion and the recess to each other defines the position of the fitted portion in the vertical direction at the upper part of the container. This facilitates the arrangement of the ultrasonic generator at a suitable position of the container.

In the above-described configuration, the ultrasonic generator includes an ultrasonic generation device and an ultrasonic propagation member that is in contact with the ultrasonic generation device, and the ultrasonic generator is configured such that the ultrasonic propagation member is held between the ultrasonic generation device and the side surface of the container by fitting the container and the fitted portion to each other.

In the above-described configuration, the ultrasonics generated by the ultrasonic generation device are transmitted through the ultrasonic propagation member to the container. This increases the efficiency for transmitting ultrasonics.

In the above-described configuration, the ultrasonic generator is part of the fitted portion and is configured to be located on a lower side of the remaining section of the fitted portion with respect to the spout.

In the above-described configuration, the ultrasonic generator, which is a portion located on the lower side of the spout, is located away from the upper end of the container. Thus, as compared to a configuration in which the ultrasonic generator is in contact with the upper end of the container, the collection of beverage flowing out of the spout on the ultrasonic vibration applying device is limited. This further reduces the burden required for the management of the ultrasonic vibration applying device.

In the above-described configuration, the ultrasonic vibration applying device may include a drive unit that generates a drive signal of an ultrasonic generation device incorporated in the ultrasonic generator and an operation part that receives an operation that instructs driving of the ultrasonic generation device. The drive unit and the operation part may be located on an opposite side of a center of a ring of the fitted portion from the ultrasonic generator.

When the user pours a sparkling beverage from the container into a glass or the like, the user holds the container from the opposite side of the center axis of the container from the spout. In the above-described configuration, the operation part is located in the proximity of the part held by the user. This allows the user to easily operate the operation part while pouring the beverage from the container.

In the above-described configuration, the ultrasonic vibration applying device may include a drive unit that generates a drive signal of an ultrasonic generation device incorporated in the ultrasonic generator and a power supply unit that supplies the drive unit with power. The power supply unit may be located on an opposite side of a center of a ring of the fitted portion from the ultrasonic generator.

In the above-described configuration, when the user holds the container from the opposite side from the spout, the power supply unit, which has a relatively large volume in the ultrasonic vibration applying device, is located in the vicinity of a portion struck by a palm of the user. This allows the user to hold the container together with the power supply unit and thus improves the stability of the positions of the container and the foaming device when pouring beverage from the container.

In the above-described configuration, the ultrasonic vibration applying device may include a drive unit that generates a drive signal of an ultrasonic generation device incorporated in the ultrasonic generator and a power supply unit that supplies the drive unit with power. The power supply unit may be configured to be arranged on an upper side of the container.

In the above-described configuration, the power supply unit, which has a relatively large volume in the ultrasonic vibration applying device, is located on the upper side of the container, as compared to a configuration in which the power supply unit is located at a position along the side surface of the container, the shifting of the center of gravity of the structure including the container and the foaming device toward the center of the structure is easily limited. Thus, when, in particular, the ultrasonic vibration applying device and the container that is almost empty after pouring of beverage are arranged upright on a horizontal surface, the falling of the container and the ultrasonic vibration applying device is limited. This facilitates the handling of the ultrasonic vibration applying device when using the ultrasonic vibration applying device.

In the above-described configuration, the ultrasonic vibration applying device may include a drive unit that generates a drive signal of an ultrasonic generation device incorporated in the ultrasonic generator, a power supply unit that supplies the drive unit with power, and an accommodation portion that accommodates the power supply unit. The accommodation portion may be configured to extend downward from the fitted portion such that a position of a lower end of the accommodation portion coincides with a position of a lower end of the container in a vertical direction.

In the above-described configuration, when the container on which the ultrasonic vibration applying device is mounted is statically placed on a support base, the container and the ultrasonic vibration applying device are supported by the support base. This limits the falling of the container and the ultrasonic vibration applying device. Further, the alignment of the positions of the lower ends of the ultrasonic vibration applying device and the container facilitates the alignment of the ultrasonic vibration applying device relative to the container.

In the above-described configuration, the ultrasonic vibration applying device may include a drive unit that generates a drive signal of an ultrasonic generation device incorporated in the ultrasonic generator, a power supply unit that supplies the drive unit with power, and an accommodation portion that accommodates the power supply unit. The accommodation portion may be configured to extend downward from the fitted portion such that a length of the accommodation portion in the vertical direction is changeable.

In the above-described configuration, multiple types of containers having different lengths in the vertical direction can be subject to mounting of the ultrasonic vibration applying device. This improves the versatility of the ultrasonic vibration applying device.

In the above-described configuration, t the ultrasonic generator may include an ultrasonic generation device, and the ultrasonic vibration applying device may protect the ultrasonic generation device from entry of liquid.

The above-described configuration limits the collection of liquid on the ultrasonic generation device, which is an electronic component. This limits a decrease in the function of the ultrasonic generation device resulting from the collection of liquid.

Effects of the Invention

The present invention can reduce the burden on the management of an ultrasonic vibration applying device.

MODES FOR CARRYING OUT THE INVENTION

First Embodiment

A first embodiment of a sparkling beverage foaming device, which is an example of an ultrasonic vibration applying device, will now be described FIGS. 1 to 10. In the following description, the vertical direction refers to a vertical direction in a case where a container on which the sparkling beverage foaming device is mounted is statically placed on a horizontal surface.

Entire Configuration of Foaming Device

Figure 1:
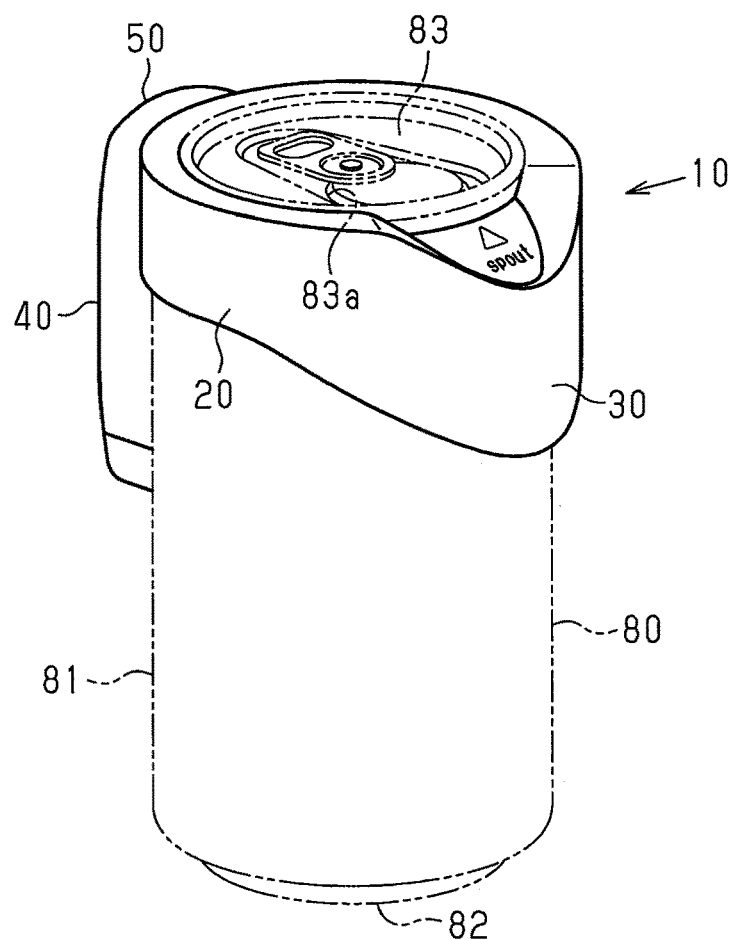
FIG. 1 is a perspective view showing an example of a foaming device according to a first embodiment of an ultrasonic vibration applying device.
Figure 2:
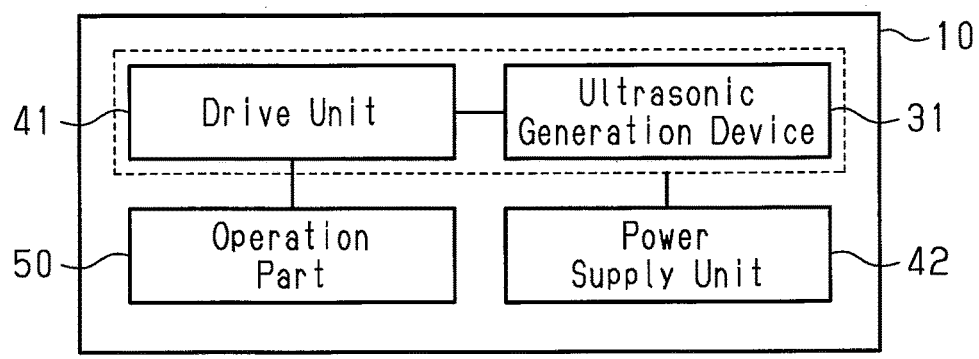
FIG. 2 is a diagram showing the electrical configuration of the foaming device of the first embodiment.

The entire configuration of the foaming device will now be described with reference to FIG. 1. A foaming device 10 is used by mounting the foaming device 10 on a container 80, which contains a sparkling beverage. With the foaming device 10 mounted on the container 80, the foaming device 10 is located outside the container 80.

The container 80 is, for example, a beverage can having a can lid of a pull-tab type or a stay-on tab type. The container 80 is mainly formed by a metal sheet such as aluminum or steel. The container 80 includes a tubular main part 81, a lower lid 82, which closes one of two tube ends of the main part 81, and an upper lid 83, which closes the other one of the tube ends. The upper lid 83 includes a single spout 83a, which is opened by pulling up the tab. That is, the container 80 includes the spout 83a at the upper part of the container 80.

A sparkling beverage contains carbonates. As long as the generation of foam is preferred, the types of the sparkling beverage are not limited. More specifically, a sparkling beverage refers to carbonated beverage into which several percent of carbon dioxide is forcibly infused, for example, beer or non-alcoholic beer.

The foaming device 10 includes a fitted portion 20, an ultrasonic generator 30, an accommodation portion 40, and an operation part 50. The fitted portion 20 is fitted to the container 80. The ultrasonic generator 30 generates ultrasonics. The accommodation portion 40 accommodates various types of electronic components needed to drive the foaming device 10. The operation part 50 switches the driving of the foaming device 10 between on and off Electric Configuration of Foaming Device The electric configuration of the foaming device 10 will now be described with reference to FIG. 2. In the electric configuration, the foaming device 10 includes an ultrasonic generation device 31 (ultrasonic generation circuit), a drive unit 41 (drive circuit), a power supply unit 42 (power supply circuit), and the above-described operation part 50. The ultrasonic generation device 31 is incorporated in the above-described ultrasonic generator 30. The drive unit 41 generates a drive signal to drive the ultrasonic generation device 31. The drive unit 41 and the power supply unit 42 are accommodated in the accommodation portion 40.

The ultrasonic generation device 31 includes an ultrasonic vibrator having, for example, a piezoelectric element. The ultrasonic generation device 31 generates ultrasonics when vibrated in accordance with the drive signal input from the drive unit 41. The drive unit 41 includes, for example, a control circuit, a DC/AC converter, and a matching circuit. The control circuit controls outputting of the drive signal to the ultrasonic generation device 31 and sets the frequency of an alternating-current signal, which is the drive signal. The DC/AC converter converts a direct-current input voltage into an alternating-current input voltage based on the signal from the control circuit and outputs the converted voltage. The matching circuit causes the output impedance to match the input impedance.

The ultrasonic generation device 31 is, for example, a circular waterproof ultrasonic sensor. The operating frequency of the ultrasonic generation device 31 is selected from, for example, a range from a frequency greater than or equal to 20 KHz to a frequency less than or equal to 40 KHz.

Taking attenuation in a propagation process of ultrasonics into account, it is preferred that the operating frequency of the ultrasonic generation device 31 be high. However, as long as the ultrasonics at a frequency capable of foaming a sparkling beverage can be output, the ultrasonic generation device 31 may have any internal configuration, any outer shape, and any operating frequency.

The power supply unit 42 supplies power needed to drive each unit of the foaming device 10 including the drive unit 41. The power supplied by the power supply unit 42 may be generated from a primary battery or a rechargeable battery. The power supply unit 42 accommodates, for example, a dry battery, which is a primary battery, and supplies each unit with the power discharged from the dry battery.

The operation part 50 outputs an operation performed by the user on the operation part 50 to the control circuit of the drive unit 41 as an electrical signal. The operation part 50 receives operations instructing the foaming device 10 to drive (i.e., ultrasonic generation device 31 to drive) and instructing the foaming device 10 to stop. For example, the operation part 50 is applied to a switch that receives these operations as whether pressing has been done. The operation part 50 is operated to switch the connection of the circuit, thereby causing the signal corresponding to the operation to be output to the drive unit 41.

Detailed Configuration of Foaming Device

The detailed configuration of the foaming device 10 will now be described with reference to FIGS. 3 to 8.

Figure 3:
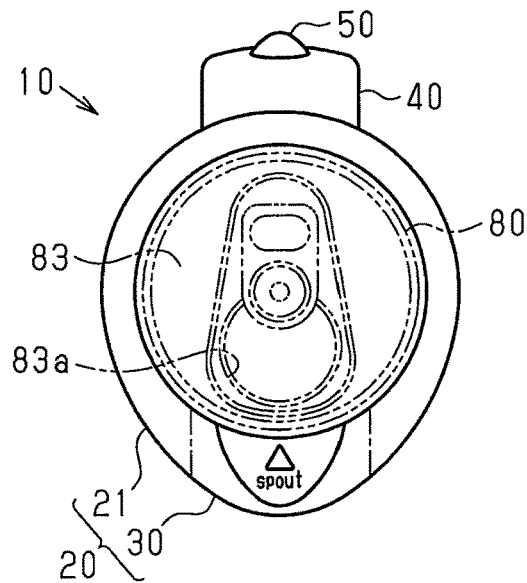
FIG. 3 is a plan view showing the foaming device of the first embodiment.
Figure 4:
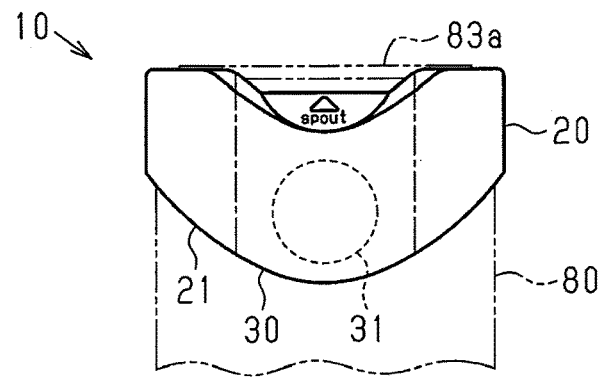
FIG. 4 is a front view showing the foaming device of the first embodiment.

As shown in FIGS. 3 and 4, the fitted portion 20 has a closed annular shape and is fitted to the upper part of the container 80. When the foaming device 10 is mounted on the container 80, the fitted portion 20 surrounds the side surface (outer surface) of the container 80. The ultrasonic generator 30 is part of the fitted portion 20. As part of the fitted portion 20, the ultrasonic generator 30 functions to fix the foaming device 10 to the container 80 as well as functions to generate ultrasonics.

More specifically, the fitted portion 20 includes an upper end fitted portion 21, which is arranged along the upper end of the container 80, and the ultrasonic generator 30. The ultrasonic generator 30 is located between the two ends of the upper end fitted portion 21 in the circumferential direction. The upper end fitted portion 21 and the ultrasonic generator 30 shape a single ring.

The ultrasonic generator 30 is arranged in contact with a portion of the side surface of the container 80 located on the lower side of the spout 83a. In other words, as viewed in the direction corresponding to the axial direction of the ring of the fitted portion 20, that is, as viewed in the direction opposing the upper lid 83 of the container 80, the ultrasonic generator 30 is in contact with the portion of the side surface of the main part 81 closest to the spout 83a, and the spout 83a and the ultrasonic generator 30 are faced with each other.

Whereas the upper end fitted portion 21 is arranged along the upper end of the container 80, the ultrasonic generator 30 is located away from the upper end of the container 80 in the vertical direction. That is, in the axial direction of the ring of the fitted portion 20, the upper end of the ultrasonic generator 30 is located on the lower side of the upper end of the upper end fitted portion 21 with respect to the spout 83a.

Figure 5:
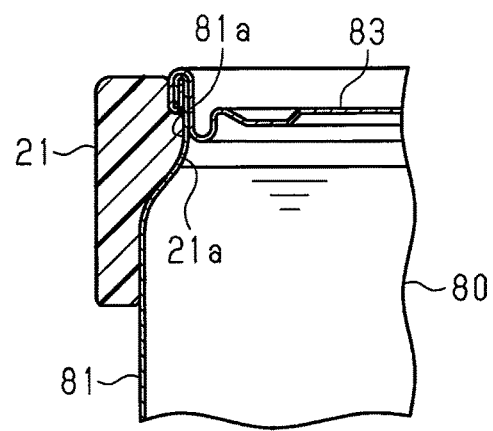
FIG. 5 is a cross-sectional view showing the upper end fitted portion in the foaming device of the first embodiment.

As shown in FIG. 5, the container 80 is shaped such that the diameter once decreases from the upper end and then gradually increases to be fixed because of the connection construction of the main part 81 and the upper lid 83. That is, the side surface of the container 80 includes a recess 81a, which is recessed toward the inner side of the container 80 from the upper end. The recess 81a extends in the circumferential direction of the container 80 over the entire circumference of the container 80.

The upper end fitted portion 21 of the foaming device 10 includes a projection 21a, which projects inward in the radial direction of the upper end fitted portion 21. The projection 21a is shaped to be fitted to the recess 81a. The projection 21a extends in the circumferential direction of the upper end fitted portion 21. When the foaming device 10 is mounted on the container 80, the projection 21a and the recess 81a are fitted to each other.

Figure 6:
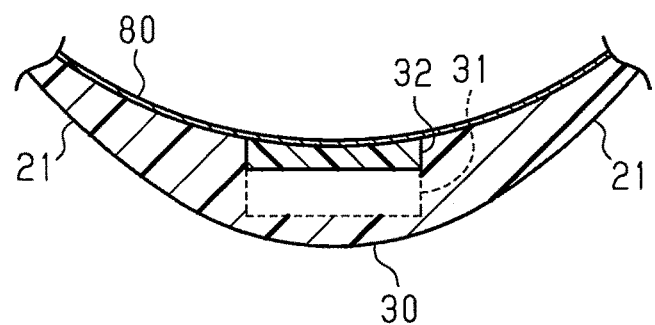
FIG. 6 is a diagram showing the configuration of the ultrasonic generator in the foaming device of the first embodiment.

As shown in FIG. 6, the ultrasonic generator 30 includes the above-described ultrasonic generation device 31 and an ultrasonic propagation member 32, which spreads like a sheet. The ultrasonic propagation member 32 serves as the inner surface of the ultrasonic generator 30 and is in contact with the ultrasonic generation device 31. When the foaming device 10 is mounted on the container 80, the ultrasonic propagation member 32 is in contact with the side surface of the container 80 and is held between the ultrasonic generation device 31 and the side surface of the container 80. The ultrasonics generated by the ultrasonic generation device 31 are transmitted to the ultrasonic propagation member 32 and then transmitted from the ultrasonic propagation member 32 to the container 80.

The ultrasonic propagation member 32 is made of a flexible member that is in close contact with the ultrasonic generation device 31 and the container 80 and can transmit ultrasonic vibration. The ultrasonic propagation member 32 is made of, for example, silicone rubber.

The ultrasonic propagation member 32 may be connected to the upper end fitted portion 21. The material of which the upper end fitted portion 21 is made is not particularly limited. For example, the upper end fitted portion 21 is made of a material capable of giving, to the upper end fitted portion 21, elasticity enough to be capable of attaching and detaching the upper end fitted portion 21 to and from the container 80. For example, the upper end fitted portion 21 is made of plastic such as silicone rubber or ABS plastic.

The upper end fitted portion 21 and the ultrasonic propagation member 32 may be formed as separate members and then connected to each other. Alternatively, when the upper end fitted portion 21 and the ultrasonic propagation member 32 are made of the same material, the upper end fitted portion 21 and the ultrasonic propagation member 32 may be formed integrally through, for example, pressing with a die. The ultrasonic propagation member 32 does not have to be arranged when, for example, ultrasonics can be transmitted from the ultrasonic generation device 31 to the container 80 in a favorable manner without the arrangement of the ultrasonic propagation member 32, such as when the adherence of the ultrasonic generation device 31 and the container 80 is good.

The portion of the ultrasonic generator 30 covering the outer side of the ultrasonic generation device 31 is applied to, for example, a structure that is made of the same material as the upper end fitted portion 21 and is continuous from the upper end fitted portion 21. For instance, in the examples shown in FIGS. 1 to 8, the outer surface of the ultrasonic generator 30 is shaped to be curved and continuous from the upper end fitted portion 21, and the ultrasonic generator 30 projects downward from the upper end fitted portion 21 in accordance with the size of the ultrasonic generation device 31. The outer shape of the ultrasonic generator 30 and the material of the portion covering the outer side of the ultrasonic generation device 31 are not particularly limited.

Figure 7:
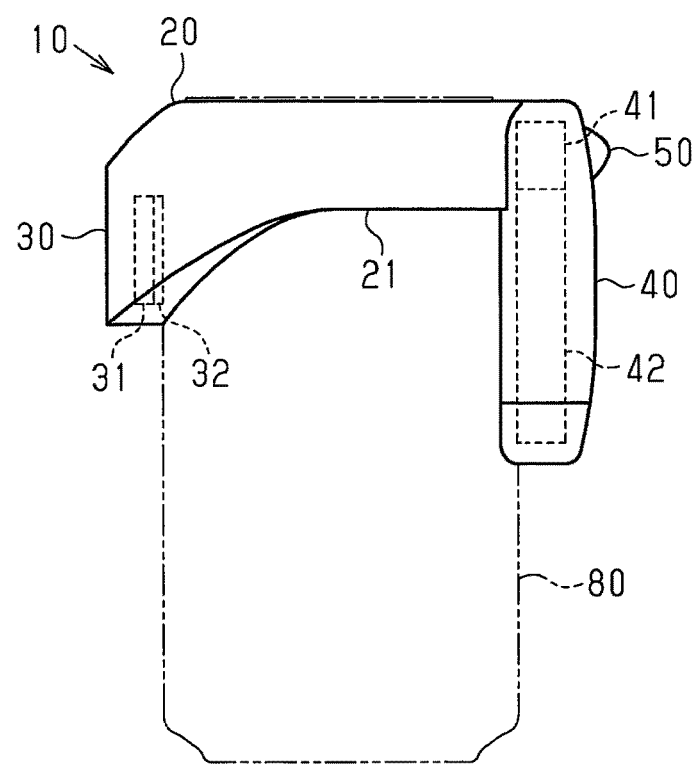
FIG. 7 is a side view showing the foaming device of the first embodiment.

As shown in FIG. 7, the accommodation portion 40, which accommodates the drive unit 41 and the power supply unit 42, is connected to the fitted portion 20 on the opposite side of the center line, which is the center of the ring of the fitted portion 20, from the ultrasonic generator 30. That is, the accommodation portion 40 is located on the opposite side of the container 80 from the ultrasonic generator 30.

The outer shape of the accommodation portion 40 is not particularly limited. The accommodation portion 40 simply needs to have a shape capable of accommodating the drive unit 41 and the power supply unit 42. For example, the accommodation portion 40 is shaped to extend downward from the fitted portion 20 and accommodates a dry battery in an exchangeable manner. The wires connecting the drive unit 41 and the power supply unit 42 to the ultrasonic generation device 31 run through the upper end fitted portion 21.

In the same manner, the operation part 50 is located on the opposite side of the center of the ring of the fitted portion 20 from the ultrasonic generator 30, that is, located on the opposite side of the container 80 from the ultrasonic generator 30.

Figure 8:
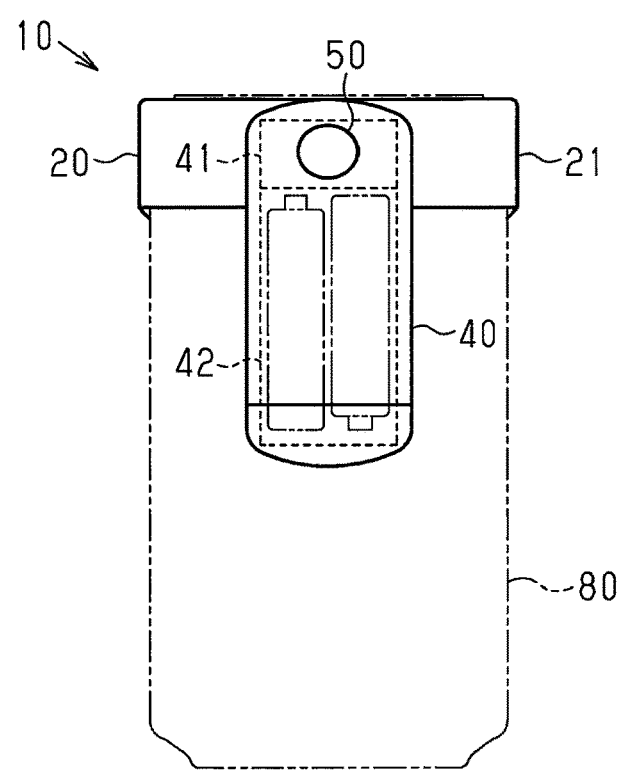
FIG. 8 is a rear view showing the foaming device of the first embodiment.

As shown in FIG. 8, the operation part 50 is arranged in a region of the outer surface of the accommodation portion 40 overlapping the fitted portion 20 in the radial direction of the upper end fitted portion 21. That is, the operation part 50 is located in the proximity of the upper end of the container 80.

The power supply unit 42 accommodates a battery as a power source. Thus, the portion of the foaming device 10 in which the power supply unit 42 is located tends to be heavier than other portions. In the configuration of the first embodiment in which the power supply unit 42 is located on the opposite side of the container 80 from the ultrasonic generator 30, adjustment may be made to prevent the weight balance in the foaming device 10 from being tilted too much toward the portion in which the power supply unit 42 is located, for example, by shaping the portion of the ultrasonic generator 30 that covers the ultrasonic generation device 31 to be thicker than the upper end fitted portion 21 or by incorporating a member that adds weight to the ultrasonic generator 30.

Method for Using Foaming Device

The method for using the foaming device 10 and the operation of the foaming device 10 will now be described with reference to FIGS. 9 and 10.

To use the foaming device 10, the user first mounts the foaming device 10 on the container 80. At this time, the user fits the fitted portion 20 to the container 80 such that the ultrasonic generator 30 is in contact with the side surface of the container 80 on the lower side of the spout 83a of the container 80. For example, the foaming device 10 may include an indication urging the user to arrange the ultrasonic generator 30 on the lower side of the spout 83a. Alternatively, the description of a manual or the like for the foaming device 10 may include an instruction for arranging the ultrasonic generator 30 on the lower side of the spout 83a. The spout 83a is opened before or after mounting the foaming device 10.

Figure 9:
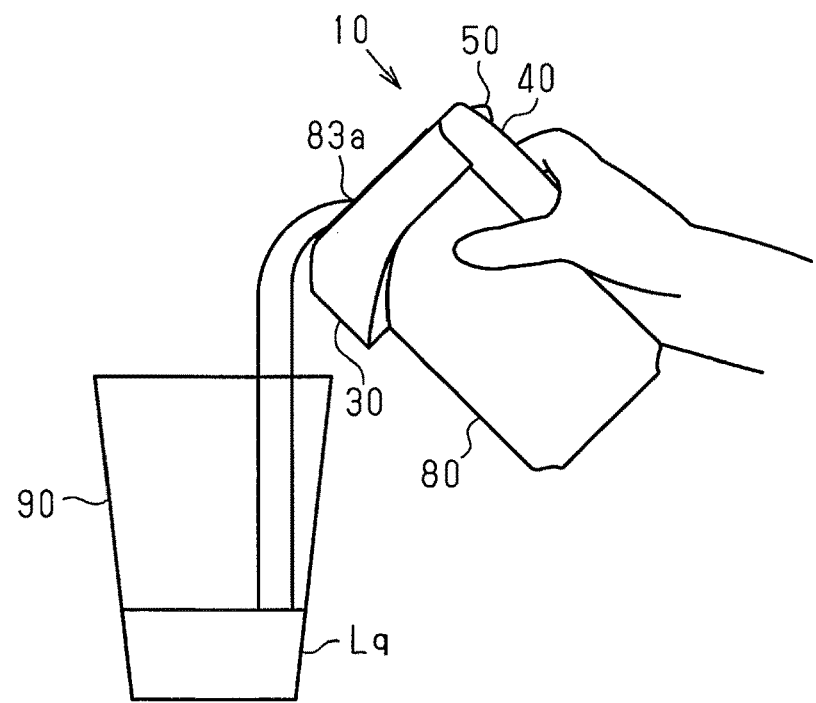
FIG. 9 is a diagram illustrating a procedure of using the foaming device of the first embodiment.

As shown in FIG. 9, after mounting the foaming device 10 on the container 80, the user lifts the foaming device 10 and the container 80 and tilts the foaming device 10 and the container 80 such that the spout 83a is located on the lower side. This causes a sparkling beverage in the container 80 to flow out of the spout 83a and pour the sparkling beverage into a cup 90 such as a glass. At this time, the foaming device 10 is off. It is preferred that the user hold the container 80 together with the foaming device 10 from the side of the container 80 where the accommodation portion 40 is located. This causes a sparkling beverage Lq, which is mostly liquid, to pour into the cup 90.

Figure 10:
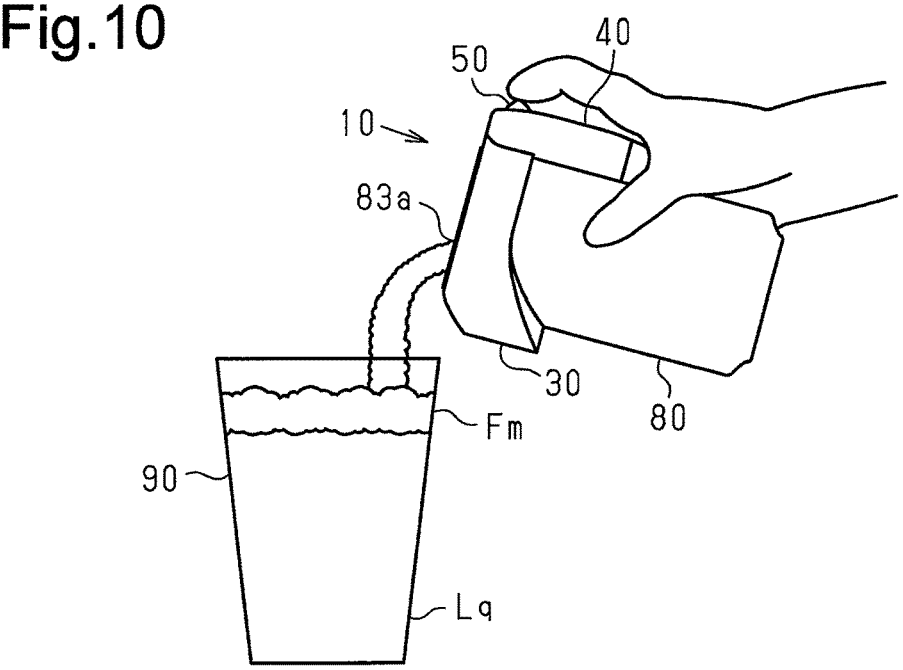
FIG. 10 is a diagram illustrating a procedure of using the foaming device of the first embodiment.

As shown in FIG. 10, at the point in time at which a suitable amount of the sparkling beverage Lq is poured into the cup 90, the user operates the operation part 50 to switch the foaming device 10 on while continuing to pour the sparkling beverage. For example, when the user holds the container 80 together with the foaming device 10 from the side of the container 80 where the accommodation portion 40 is located, the user can easily switch the foaming device 10 from off to on by shifting the position of the index finger to operate the operation part 50.

Based on the input of a signal from the operation part 50, the drive signal is output from the drive unit 41 to the ultrasonic generation device 31. This causes the ultrasonic generation device 31 to generate ultrasonics. The ultrasonics are transmitted through the ultrasonic propagation member 32 to the side surface of the container 80 and further transmitted to the sparkling beverage in the container 80.

At this point in time, the sparkling beverage left in the container 80 is part of the sparkling beverage that initially filled the container 80. Tilting the container 80 causes the sparkling beverage left in the container 80 to accumulate in the vicinity of the spout 83a in the container 80. In a configuration where the ultrasonic generator 30 is in contact with the side surface of the container 80 on the lower side of the spout 83a with the container 80 statically placed, when the container 80 is tilted such that the sparkling beverage is poured from the spout 83a, the ultrasonic generation device 31 is located on the lower side of the spout 83a, that is, located in the proximity of the portion of the container 80 in which the sparkling beverage accumulates. Therefore, the ultrasonics generated from the ultrasonic generation device 31 are properly transmitted to the sparkling beverage in the container 80.

Further, the ultrasonics generated from the ultrasonic generation device 31 are transmitted to the container 80 through the ultrasonic propagation member 32 that is in close contact with the side surface of the ultrasonic generation device 31 and the container 80. This limits the loss of the ultrasonic vibration in the propagation process and increases the efficiency for transmitting the ultrasonics.

The ultrasonic vibration foams the sparkling beverage in the container 80, and the foam Fm flows out of the spout 83a and pours into the cup 90. This allows the sparkling beverage in the container 80 to move into the cup 90 such that the foam Fm is on the sparkling beverage Lq, which is liquid, in the cup 90.

In the present embodiment, the ultrasonics generated by the foaming device 10 are transmitted from the side surface of the container 80 to the sparkling beverage in the container 80. Thus, the sparkling beverage is foamed without directly contacting the foaming device 10 and is poured into the cup 90. This eliminates the need to clean the foaming device 10 for every use and thus reduces the burden on the management of the foaming device 10. Additionally, even in the configuration where the ultrasonic generator 30 is located on the lower side of the spout 83a, the ultrasonic generator 30 is located away from the upper end of the container 80. Thus, as compared to a configuration in which the ultrasonic generator 30 is in contact with the upper end of the container 80, the collection of the sparkling beverage flowing out of the spout 83a on the foaming device 10 is limited. Accordingly, the burden on the management of the foaming device 10 is further reduced.

Foaming devices compared with the present embodiment include a device used such that the upper part of a sparkling beverage is foamed by causing an ultrasonic generation device to contact the side surface of a container containing the sparkling beverage with the container statically placed. However, when the upper part of the sparkling beverage contained in the container is foamed using ultrasonic vibration, the lower part, which is liquid, also receives vibration and then goes flat. This easily reduces the taste of the sparkling beverage. In addition, part of the sparkling beverage in the container is foam. Thus, the amount of the liquid part varies depending on the generation amount of foam. The generation amount of foam varies depending on the contact position and time of the ultrasonic generation device. This makes it difficult to control the proportion of liquid and foam at the user's wish. Further, if the container is opaque, the generation amount of foam can be checked only from the upper side of the container. This makes it more difficult to control the proportion of liquid and foam at the user's wish.

When the foaming device 10 of the present embodiment is used, the sparkling beverage poured into the cup 90 in advance remains liquid without receiving vibration. This limits degradation in the taste of a sparkling beverage. Moreover, the amount of the liquid part can be easily checked. This facilitates the controlling of the proportion of liquid and foam in the sparkling beverage.

As described above, the first embodiment provides the following advantages.

(1) When the container 80 and the fitted portion 20 are fitted to each other, the ultrasonic generator 30 is arranged in contact with the side surface of the container 80 on the lower side of the spout 83a. Accordingly, since the ultrasonics generated by the ultrasonic generator 30 are transmitted from the side surface of the container 80 to a sparkling beverage in the container 80, the sparkling beverage in the container 80 is foamed without directly contacting the foaming device 10 and is poured from the spout 83a. This eliminates the need to clean the foaming device 10 for every use and thus reduces the burden on the management of the foaming device 10.

In addition, the fitted portion 20 is fitted to the container 80 to surround the side surface of the container 80. Thus, as compared to a mode in which the foaming device is mounted on the container 80 such that the foaming device is located on the upper side of the container 80, the separation of the foaming device 10 from the container 80 is limited.

(2) The ultrasonic generator 30 is part of the fitted portion 20 and is located on the lower side of the upper end fitted portion 21, which is the remaining section of the fitted portion 20, with respect to the spout 83a. Thus, since the ultrasonic generator 30 is located away from the upper end of the container 80, the collection of the sparkling beverage flowing out of the spout 83a on the foaming device 10 is limited. This further reduces the burden on the management of the foaming device 10.

(3) The fitted portion 20 has a shape that allows to be fitted to the container 80, which is a beverage can. Thus, when the user drinks a sparkling beverage contained in a commercially available beverage can, the user can use the foaming device 10 by directly mounting the foaming device 10 on the beverage can. Thus, as compared to when, for example, a dedicated container is required for the use of the foaming device 10, the foaming device 10 is highly versatile and the convenience for the user is improved.

(4) The upper end fitted portion 21 includes the projection 21a. This allows the upper end fitted portion 21 to be fitted to the recess 81a of the container 80, which is a beverage can. Since the upper end fitted portion 21 is fitted to the container 80, the position of the foaming device 10 relative to the container 80 is highly stable. Further, the fitting of the projection 21a and the recess 81a to each other defines the position of the fitted portion 20 in the vertical direction at the upper part of the container 80. This facilitates the arrangement of the fitted portion 20 including the ultrasonic generator 30 at a suitable position of the container 80.

(5) The ultrasonic generator 30 includes the ultrasonic propagation member 32, which is in contact with the ultrasonic generation device 31. When the container 80 and the fitted portion 20 are fitted to each other, the ultrasonic propagation member 32 is in contact with the side surface of the container 80 so as to be held between the ultrasonic generation device 31 and the side surface of the container 80. Thus, the ultrasonics generated by the ultrasonic generation device 31 are transmitted to the container 80 through the ultrasonic propagation member 32 that is in close contact with the ultrasonic generation device 31 and the side surface of the container 80. This increases the efficiency for transmitting the ultrasonics.

(6) As viewed in the direction corresponding to the axial direction of the ring of the fitted portion 20, the drive unit 41, the power supply unit 42, and the operation part 50 are located on the opposite side of the center of the ring of the fitted portion 20 from the ultrasonic generator 30. When the user pours a sparkling beverage from the container 80 into the cup 90, the user holds the container 80 from the opposite side of the center axis of the container 80 from the spout 83a. Thus, in the above-described configuration, the accommodation portion 40, which accommodates the drive unit 41 and the power supply unit 42, is located in the proximity of a portion struck by a palm of the user. This allows the user to hold the container 80 together with the accommodation portion 40. Therefore, the container 80 and the foaming device 10 are easy to hold, and the stability of the positions of the container 80 and the foaming device 10 when pouring a sparkling beverage from the container 80 into the cup 90 are improved.

Additionally, the operation part 50 is located in the proximity of a portion held by the user. This allows the user to easily operate the operation part 50 while pouring the sparkling beverage from the container 80 into the cup 90 by holding the container 80 and the foaming device 10.

Second Embodiment

A second embodiment of a sparkling beverage foaming device, which is an example of an ultrasonic vibration applying device, will now be described FIGS. 11 to 13. The following description focuses on the difference of the second embodiment from the first embodiment. Like or the same reference numerals are given to the corresponding components of the first embodiment. Such components will not be described.

Figure 11:
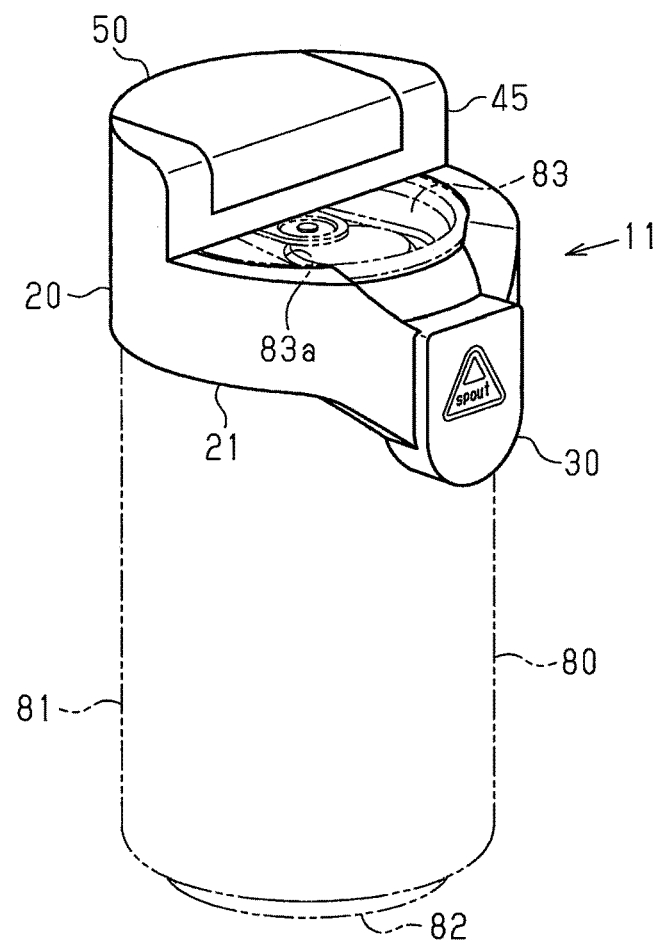
FIG. 11 is a perspective view showing an example of a foaming device according to a second embodiment of an ultrasonic vibration applying device.

As shown in FIG. 11, in a foaming device 11 of the second embodiment, the configuration of an accommodation portion differs from that of the foaming device 10 of the first embodiment. Other than the accommodation portion, the foaming device 11 of the second embodiment has the same configuration as the foaming device 10 of the first embodiment.

Figure 12:
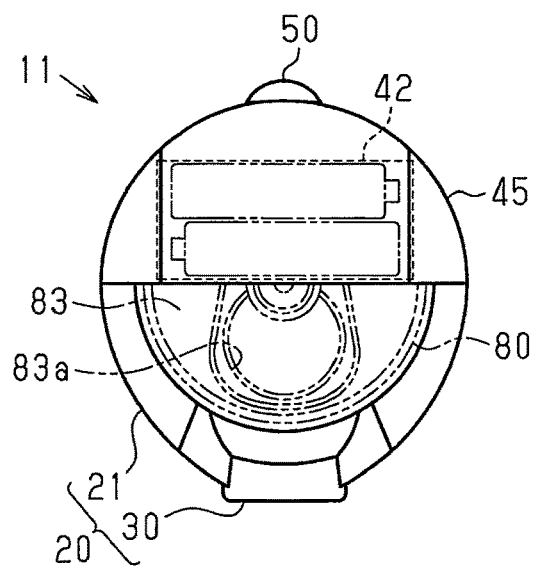
FIG. 12 is a plan view showing the foaming device of the second embodiment.
Figure 13:
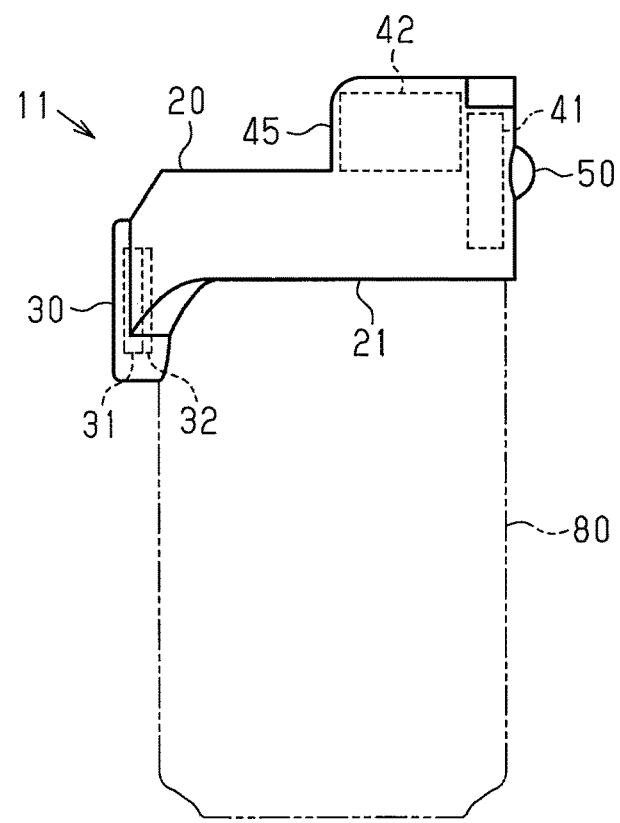
FIG. 13 is a side view showing the foaming device of the second embodiment.

FIGS. 11 to 13 show an example in which the outer surface of the ultrasonic generator 30 is configured to include a portion that has a step difference and projects from the upper end fitted portion 21. The ultrasonic generator 30 may have any outer shape. Regardless of the configuration of the accommodation portion, the shape illustrated in the first embodiment, the shape illustrated in the second embodiment, or a shape that differs from these shapes may be employed.

As shown in FIGS. 12 and 13, the foaming device 11 of the second embodiment includes an accommodation portion 45, and the accommodation portion 45 is located on the upper side of the upper lid 83 of the container 80. More specifically, the accommodation portion 45 is connected to the upper end of a part of the fitted portion 20 that includes, as the center, the section located on the opposite side of the center of the ring of the fitted portion 20 from the ultrasonic generator 30. The accommodation portion 45 may be formed integrally with the fitted portion 20. Alternatively, the accommodation portion 45 and the fitted portion 20 may be formed as separate members and then connected to each other. As viewed in the direction corresponding to the axial direction of the fitted portion 20, the accommodation portion 45 covers almost half of the upper lid 83, and in the region surrounded by the fitted portion 20, the spout 83a is exposed from a region where the accommodation portion 45 is not located.

The accommodation portion 45 accommodates the power supply unit 42 on the upper side of the upper lid 83. That is, the power supply unit 42 is located on the upper side of the container 80.

The drive unit 41 is located on the opposite side of the center of the ring of the fitted portion 20 from the ultrasonic generator 30. The drive unit 41 may be accommodated in the accommodation portion 45, may be accommodated inside the fitted portion 20, or may be accommodated in the accommodation portion 45 and the fitted portion 20 such that the drive unit 41 extends over the accommodation portion 45 and the fitted portion 20. As another option, an accommodation portion that accommodates the drive unit 41 may be projected from the fitted portion 20 toward the outer side of the upper end fitted portion 21 in the radial direction.

In the same manner as the first embodiment, the operation part 50 is located on the opposite side of the center of the ring of the fitted portion 20 from the ultrasonic generator 30. The operation part 50 is located at, for example, a position overlapping the drive unit 41 in the radial direction of the upper end fitted portion 21. That is, the operation part 50 is located in, for example, a region in the outer surface of the fitted portion 20 or the accommodation portion 45 or is located in a region extending over the outer surface of the fitted portion 20 and the outer surface of the accommodation portion 45.

The foaming device 11 of the second embodiment is used with the same method as that of the foaming device 10 of the first embodiment. That is, the user turns the foaming device 10 off to pour a suitable amount of a sparkling beverage from the container 80 into the cup 90 and then turns the foaming device 10 on to generate foam and pour the foam from the container 80 into the cup 90.

As described above, the power supply unit 42 accommodates a battery as a power source. Thus, the portion of the foaming device 11 in which the power supply unit 42 is located tends to be heavier than other portions. In particular, when a sparkling beverage is poured from the container 80 into the cup 90 and then the container 80 becomes almost empty, the vicinity of the power supply unit 42 serves as the center of gravity of the structure including the container 80 and the foaming device 11.

In the configuration in which the power supply unit 42 is located on the upper side of the container 80, as compared to a configuration in which the power supply unit 42 is located at a position along the side surface of the container 80, the shifting of the center of gravity of the structure including the container 80 and the foaming device 11 toward the center of the structure is easily limited. This limits situations in which the container 80 and the foaming device 11 fall when the container 80 and the foaming device 11 are arranged upright on a horizontal surface. Thus, the handling of the foaming device 11 when using the foaming device 11 is easy.

As described above, the second embodiment provides the following advantage in addition to the advantages (1) to (5) of the first embodiment.

(7) The power supply unit 42 is located on the upper side of the container 80. This easily limits the shifting of the center of gravity of the structure including the container 80 and the foaming device 11 toward the center of the structure. Accordingly, the container 80 and the foaming device 11 do not easily fall, and the handling of the foaming device 11 when using the foaming device 11 is easy.

Additionally, in the same manner as the first embodiment, the operation part 50 is located in the proximity of a portion held by the user. This allows the user to easily operate the operation part 50 while pouring the sparkling beverage from the container 80 into the cup 90 by holding the container 80 and the foaming device 11.

Third Embodiment

A third embodiment of a sparkling beverage foaming device, which is an example of an ultrasonic vibration applying device, will now be described in FIGS. 14 and 15. The following description focuses on the difference of the third embodiment from the first embodiment. Like or the same reference numerals are given to the corresponding components of the first embodiment. Such components will not be described.

Figure 14:
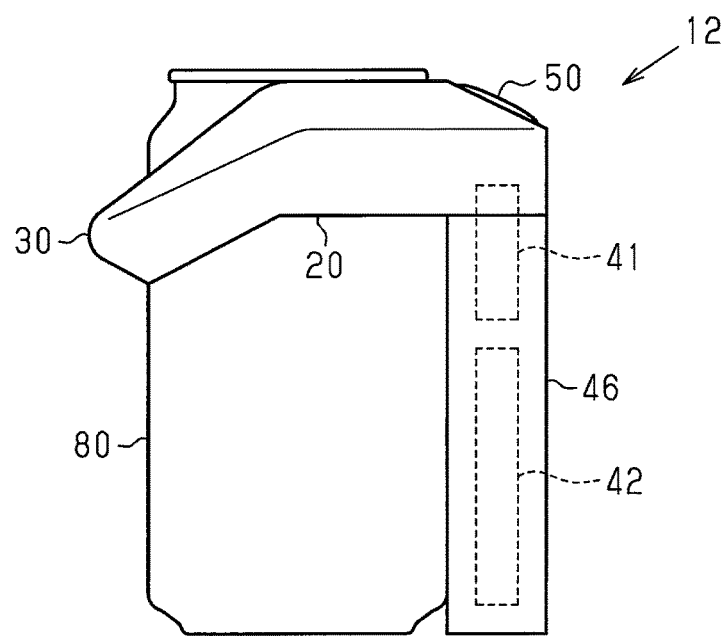
FIG. 14 is a side view showing an example of a foaming device according to a third embodiment of an ultrasonic vibration applying device.

As shown in FIG. 14, a foaming device 12 of the third embodiment includes an accommodation portion 46, and the accommodation portion 46 extends downward from the fitted portion 20. When the foaming device 12 is mounted on the container 80, the position of the lower end of the accommodation portion 46 coincides with the position of the lower end of the container 80 in the vertical direction. The accommodation portion 46 accommodates the drive unit 41 and the power supply unit 42.

In the above-described configuration, when the container 80 and the foaming device 12 are statically placed on a support base such as a table, the lower end of the container 80 and the lower end of the accommodation portion 46 are in contact with the surface of the support base. That is, the container 80 and the foaming device 12 are supported by the support base. Thus, the container 80 and the foaming device 12 do not easily fall. In particular, even when the container 80 is almost empty and the center of gravity of the structure including the container 80 and the foaming device 12 is shifted toward the center of the structure, the falling of the container 80 and the foaming device 12 is limited. Thus, the handling of the foaming device 12 when using the foaming device 12 is easy.

As described above, the power supply unit 42 accommodates a battery and thus tends to become heavy. Thus, in the configuration in which the accommodation portion 46 accommodates the power supply unit 42 in the vicinity of the lower end of the accommodation portion 46, the positions of the container 80 and the foaming device 12 are in particular easily stable.

The length of the accommodation portion 46 in the vertical direction may be set to a predetermined length in correspondence with the length of the container 80 that is subject to mounting, and the accommodation portion 46 may be configured such that the length of the accommodation portion 46 is changeable in accordance with the length of the container 80 that is subject to mounting. For example, when two types of containers 80 having the same diameter and different lengths in the vertical direction such as beverage cans having a capacity of 350 ml and 500 ml are subject to mounting, the length of the accommodation portion 46 may be changeable in two stages.

Figure 15:
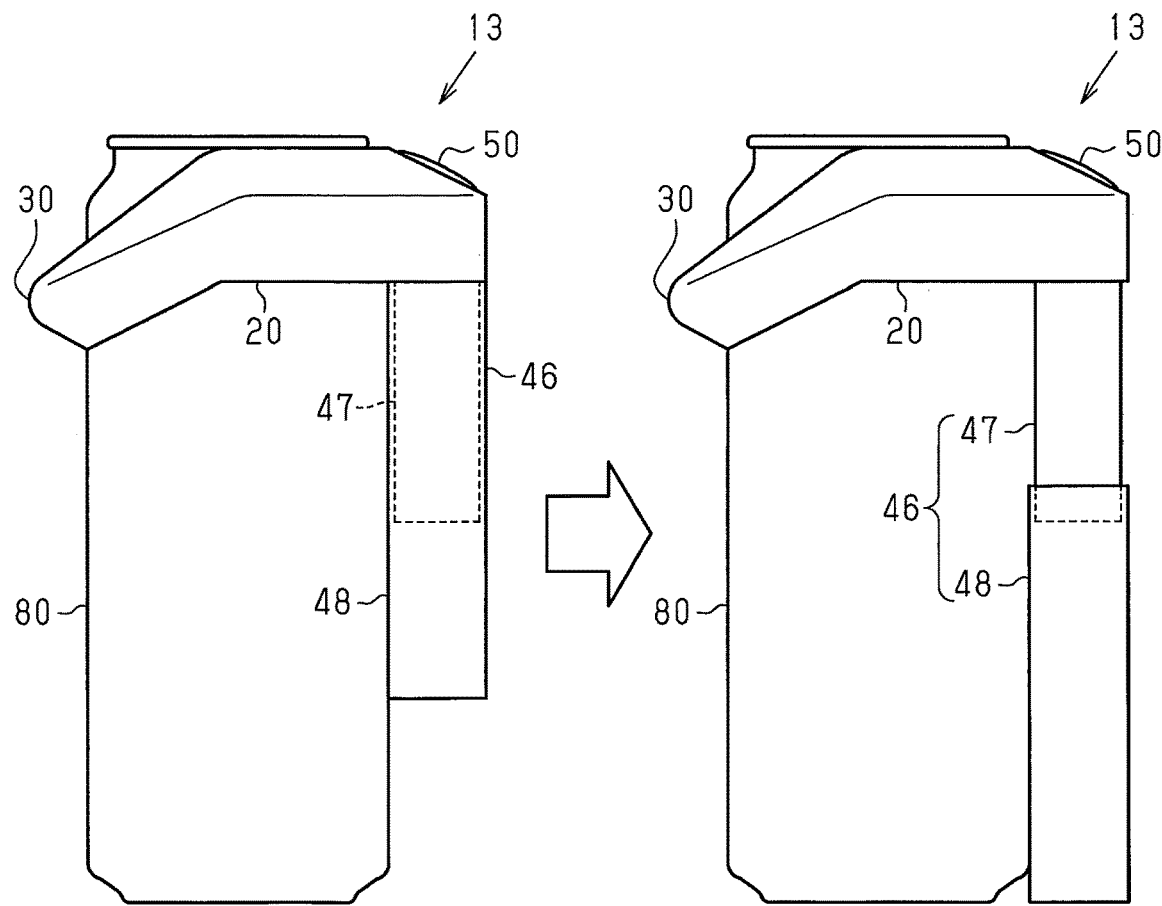
FIG. 15 is a side view showing a change in the length of the accommodation portion in the foaming device of the third embodiment.

FIG. 15 shows an example of a foaming device 13, in which the length of the accommodation portion 46 is changeable. The accommodation portion 46 includes an internal part 47 and an exterior part 48. The internal part 47 extends from the fitted portion 20 and is inserted into the exterior part 48. The exterior part 48 can slide along the internal part 47 in the vertical direction.

The internal part 47 and the exterior part 48 have an engagement construction. In this construction, the exterior part 48 is engaged with the internal part 47 at two positions, namely, a first position and a second position. At the first position, for example, the internal part 47 is entirely inserted into the exterior part 48. At the second position, the internal part 47 is partially located out of the upper end of the exterior part 48, and the exterior part 48 is located at a position lower than that of the first position. The length of the entire accommodation portion 46 is longer at the second position than at the first position. The engagement construction is not particularly limited as long as the exterior part 48 is engaged with the internal part 47. The engagement construction is applied to, for example, a construction in which a protrusion of one of the internal part 47 and the exterior part 48 is hooked by a groove of the other one of the internal part 47 and the exterior part 48 or a construction in which protrusions of the internal part 47 and the exterior part 48 are engaged with each other.

The length of the accommodation portion 46 with the exterior part 48 located at the first position is set such that the position of the lower end of the accommodation portion 46 coincides with the position of the lower end of the container 80 when the foaming device 13 is mounted on one of the two types of containers 80 subject to mounting that has a shorter length in the vertical direction.

Downward sliding of the exterior part 48 moves the position of the exterior part 48 from the first position to the second position and lengthens the entire accommodation portion 46. The length of the accommodation portion 46 with the exterior part 48 located at the second position is set such that position of the lower end of the accommodation portion 46 coincides with the position of the lower end of the container 80 when the foaming device 13 is mounted on one of the two types of containers 80 subject to mounting that has a longer length in the vertical direction.

FIG. 15 shows an example in which the foaming device 13 with the exterior part 48 located at the first position is mounted on one of the two types of containers 80 subject to mounting that has a longer length in the vertical direction and then the exterior part 48 is moved to the second position. This movement causes the position of the lower end of the accommodation portion 46 to coincide with the position of the lower end of the container 80 in the vertical direction. The foaming device 13 may be mounted on the container 80 after the exterior part 48 is arranged at the second position in advance.

The foaming devices 12 and 13 of the third embodiment are used with the same method as the foaming device 10 of the first embodiment. FIGS. 14 and 15 show modes in which the operation part 50 is located on the opposite side of the center of the ring of the fitted portion 20 from the ultrasonic generator 30 and is located on the upper surface of the fitted portion 20. The operation part 50 may be located on the upper surface of the fitted portion 20 also in the first embodiment and the second embodiment. In such a mode, when the user operates the operation part 50 using the index finger, the operation part 50 can be easily operated.

The construction for making the length of the accommodation portion 46 changeable is not limited to the above-described construction in which the exterior part 48 slides relative to the internal part 47. Also, the length of the accommodation portion 46 in the vertical direction may be changeable in three or more stages.

As described above, the third embodiment provides the following advantage in addition to the advantages (1) to (6) of the first embodiment.

(8) The accommodation portion 46 is configured such that the position of the lower end of the accommodation portion 46 coincides with to the position of the lower end of the container 80 in the vertical direction. Thus, when the container 80 on which the foaming device 12 or 13 is mounted is statically placed on a support base, the container 80 and the foaming device 12 or 13 are supported by the support base. This limits the falling of the container 80 and the foaming device 12 or 13. Further, the alignment of the positions of the lower ends of the accommodation portion 46 and the container 80 facilitates the alignment of the foaming device 12 or 13 relative to the container 80.

(9) The length of the accommodation portion 46 in the vertical direction is changeable. Thus, multiple types of containers 80 having different lengths in the vertical direction can be subject to mounting of the foaming device 13. This improves the versatility of the foaming device 13.

Modifications

The above-described first to third embodiments may be modified as follows.

Position of Operation Part 50

Modifications for the position of the operation part 50 and the surrounding configuration of the operation part 50 will now be described.

In the first embodiment, the mode in which the user holds the container 80 together with the foaming device 10 to operate the operation part 50 such that a palm contacts the accommodation portion 40 is illustrated. Instead, the user may hold the foaming device and the container such that the back of fingers contact the accommodation portion. Additionally, the accommodation portion may be provided with a construction for guiding how to hold the foaming device and the container by the user.

Figure 16:
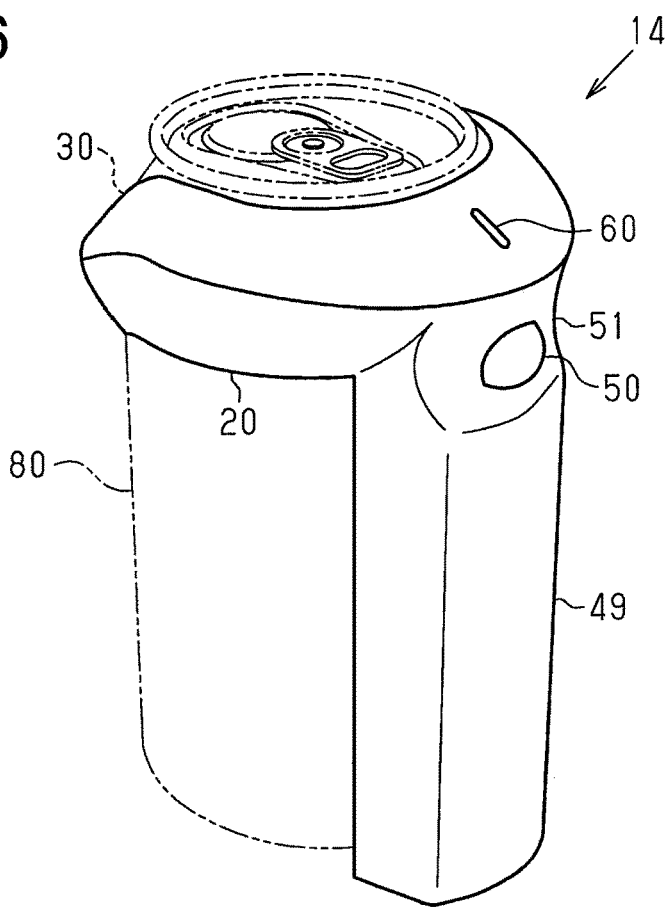
FIG. 16 is a perspective view showing a foaming device according to a modification.
Figure 17:
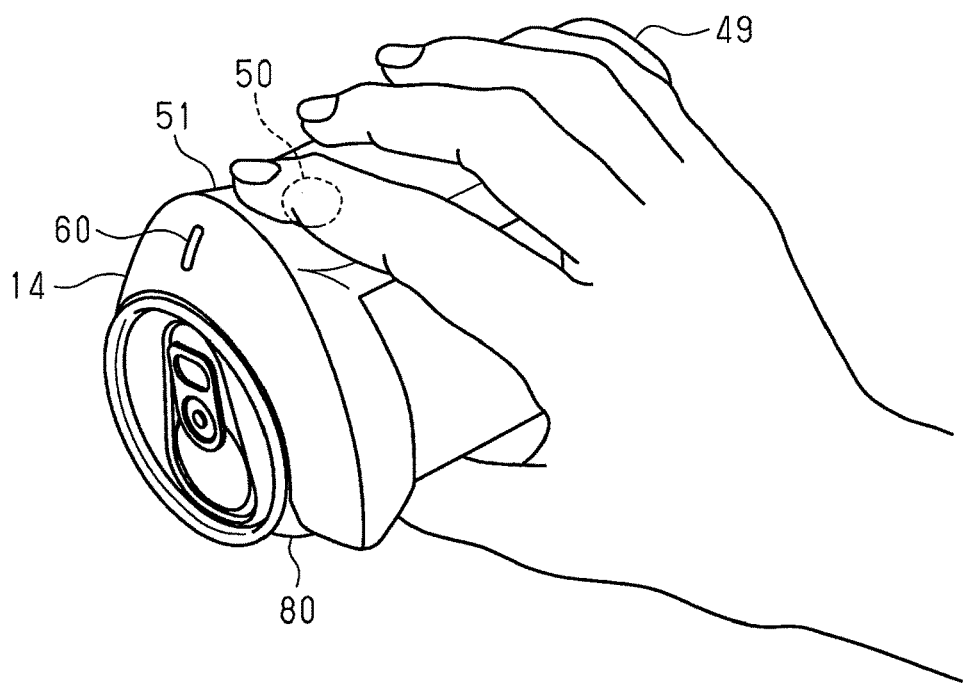
FIG. 17 is a diagram showing a mode of using the foaming device of the modification.

For example, like in a foaming device 14 shown in FIG. 16, an accommodation portion 49 may include a depression 51 located around the operation part 50. The operation part 50 is located on the bottom of the depression 51. In this case, as shown in FIG. 17, the user holds the foaming device 14 and the container 80 to operate the operation part 50 by putting the index finger along the depression 51. That is, how to hold the foaming device 14 and the container 80 is guided such that the back of the fingers contact the accommodation portion 49. Such a way of holding allows a user with small hands to hold the foaming device 14 and the container 80 more easily than the way of holding in which a palm contacts the accommodation portion. Further, operating the operation part 50 does not require the index finger to move to a large extent. This facilitates the operating of the operation part 50 while holding the foaming device 14 and the container 80. Additionally, when pouring a sparkling beverage, the user can tilt the foaming device 14 and the container 80 while supporting the lower side of the container 80 using a thumb. This easily stabilizes the angles of the foaming device 14 and the container 80.

Figure 18:
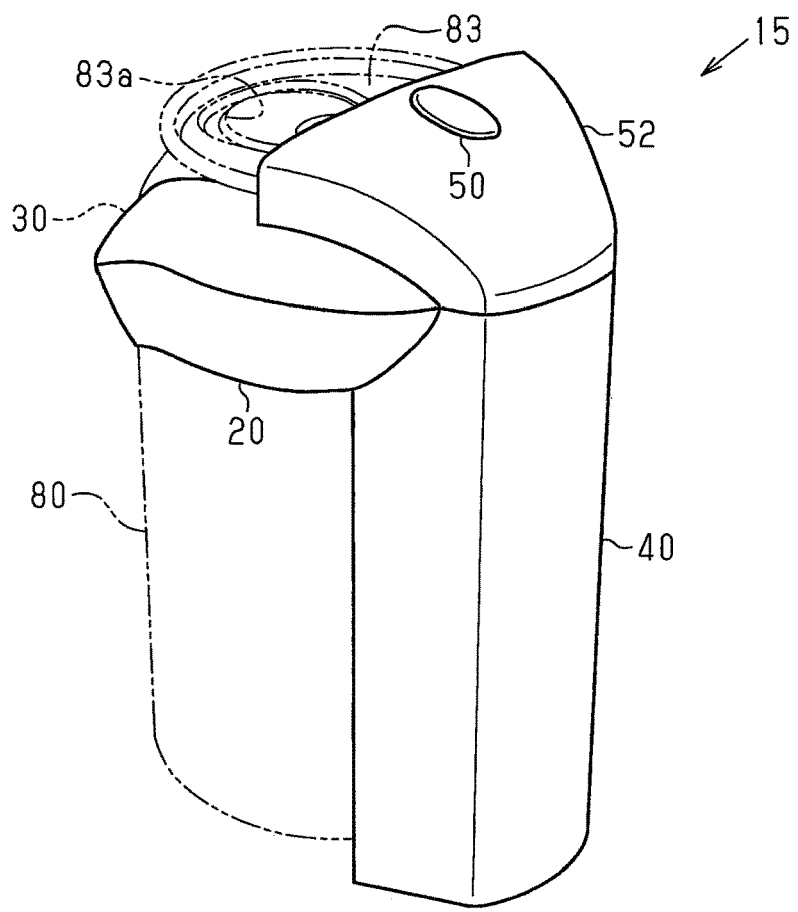
FIG. 18 is a perspective view showing a foaming device according to a modification.

Like in a foaming device 15 shown in FIG. 18, the operation part 50 may be arranged on the upper side of the upper lid 83 of the container 80. More specifically, a support 52, which supports the operation part 50, is located on the upper side of the upper lid 83, and the operation part 50 is located on the upper surface of the support 52. The support 52 is connected to the upper end of a part of the fitted portion 20 that includes, as the center, the section on the opposite side of the center of the ring of the fitted portion 20 from the ultrasonic generator 30. As viewed in the direction corresponding to the axial direction of the fitted portion 20, the spout 83a is exposed from a region where the support 52 is not located in the region surrounded by the fitted portion 20.

Figure 19:
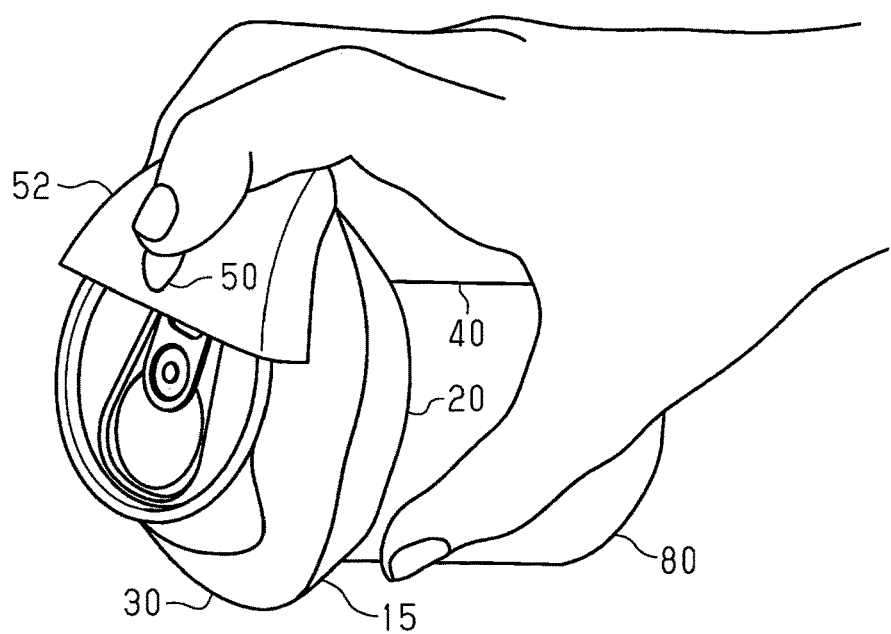
FIG. 19 is a diagram showing a mode of using the foaming device of the modification.

As shown in FIG. 19, the user holds the foaming device 15 and the upper part of the container 80 from the opposite side of the container 80 from the ultrasonic generator 30. At this time, since the operation part 50 is located on the upper side of the upper lid 83, the index finger easily reaches the operation part 50 when the finger is naturally extended. This facilitates the operating of the operation part 50 while holding the foaming device 15 and the container 80.

Figure 20:
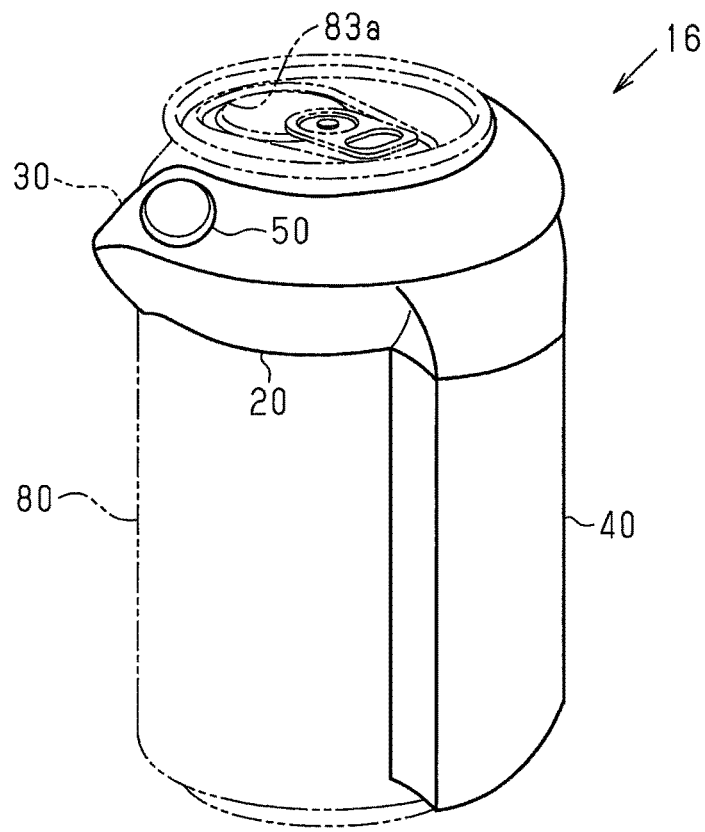
FIG. 20 is a perspective view showing a foaming device according to a modification.

Like in a foaming device 16 shown in FIG. 20, the operation part 50 may be arranged on the upper surface of the fitted portion 20 beside the spout 83a. In other words, the operation part 50 is located on the upper surface of a portion of the fitted portion 20 that connects the ultrasonic generator 30 and the accommodation portion 40 to each other.

Figure 21:
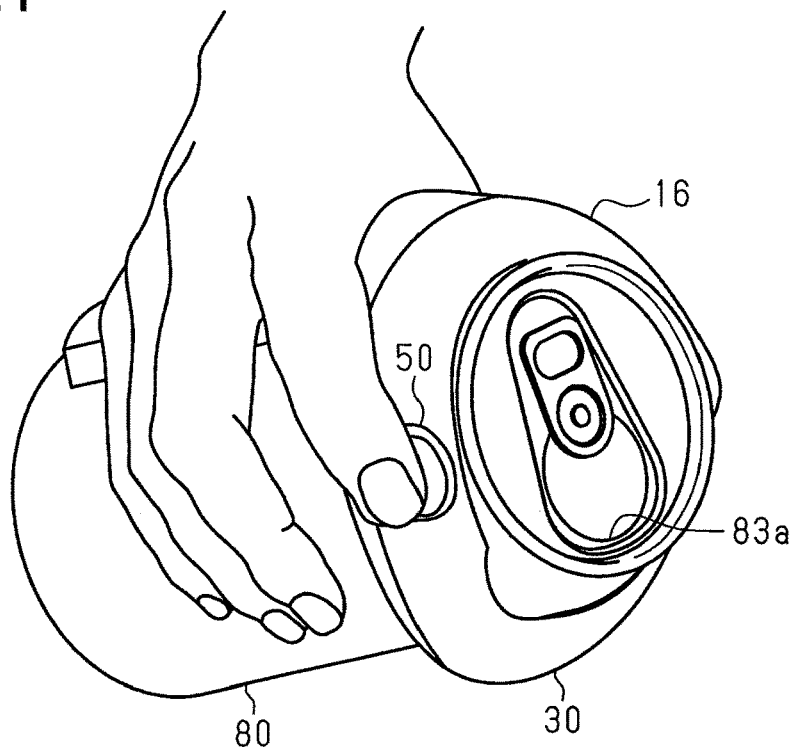
FIG. 21 is a diagram showing a mode of using the foaming device of the modification.

As shown in FIG. 21, the user holds the foaming device 16 and the container 80 from the opposite side of the container 80 from the ultrasonic generator 30. At this time, since the operation part 50 is located beside the spout 83a, the index finger easily reaches the operation part 50 when the finger is extended. This facilitates the operating of the operation part 50 while holding the foaming device 16 and the container 80.

Whether the operation part 50 is arranged on the right or left side of the spout 83a simply needs to be determined in accordance with whether a right-handed user or a left-handed user is a subject. Alternatively, operation parts 50 may be arranged at two positions, namely, the right and left sides of the spout 83a.

FIGS. 16 and 17 show an example of the mode in which the foaming device 14 includes a display 60. The display 60 indicates whether the foaming device is on or off, that is, indicates whether the ultrasonic generation device 31 is being driven. The display 60 includes, for example, a light source such as LED and notifies the outside of a drive state of the ultrasonic generation device 31 when the light source goes on. Such a configuration allows the user to easily check the drive state of the ultrasonic generation device 31. The foaming devices of the above-described embodiments and the modifications may include the display 60.

While the position of the display 60 is not particularly limited, for example, as shown in FIGS. 16 and 17, the display 60 is arranged on the opposite side of the center of the ring of the fitted portion 20 from the ultrasonic generator 30 as viewed in the direction corresponding to the axial direction of the ring. The arrangement of the display 60 at such a position allows the user to easily see the display 60 even while pouring a sparkling beverage into the cup 90 by holding the foaming device 14 and the container 80.

Protection of Ultrasonic Generation Device 31

As described in the first embodiment, in the configuration in which the ultrasonic generator 30 is located away from the upper end of the container 80, the collection of a sparkling beverage flowing out of the spout 83a on the foaming device is limited. However, if a sparkling beverage collects on the ultrasonic generator 30, the collected beverage or liquid such as moisture used for cleaning the collected beverage enters the vicinity of the ultrasonic generation device 31. Thus, it is preferred that the ultrasonic generation device 31, which is an electronic component, be protected. The construction for protecting the ultrasonic generation device 31 will now be described.

Figure 22:
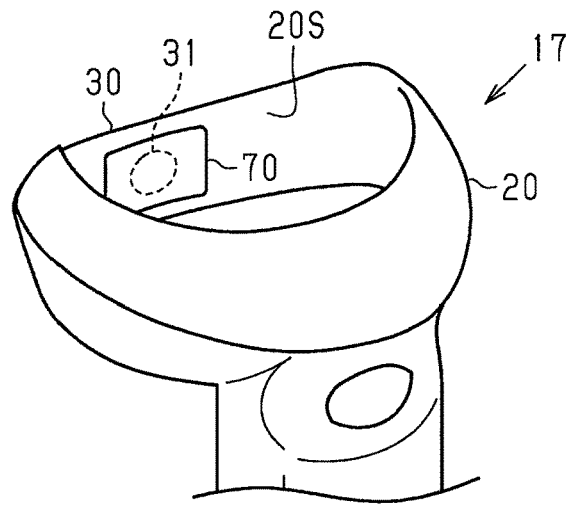
FIG. 22 is a diagram showing the external construction of the vicinity of the ultrasonic generator in a foaming device according to a modification.

FIG. 22 shows a foaming device 17, which includes a protection sheet 70. The protection sheet 70 covers the ultrasonic generation device 31 from the inner side of the fitted portion 20. The protection sheet 70 covers the ultrasonic generation device 31 and a portion of an inner surface 20S of the fitted portion 20 that surrounds the outer circumference of the ultrasonic generation device 31. The protection sheet 70 is made of a material that limits the prevention of transmission of ultrasonics and limits the passage of liquid. For example, the protection sheet 70 is made of plastic such as polyethylene terephthalate. The portion of the inner surface 20S of the fitted portion 20 to which the protection sheet 70 is attached serves as the inner surface 20 of the ultrasonic generator 30.

Figure 23:
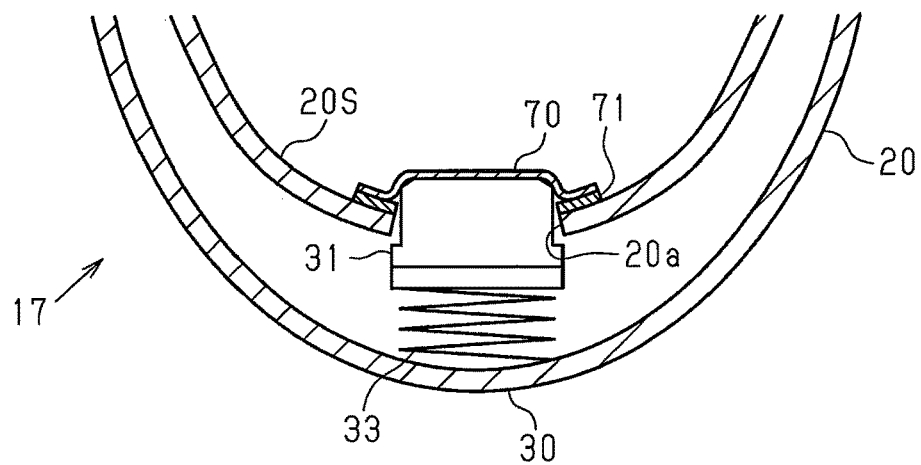
FIG. 23 is a diagram showing the internal construction of the vicinity of the ultrasonic generator in the foaming device according to the modification.

As shown in FIG. 23, the foaming device 17 does not include the ultrasonic propagation member 32, and the ultrasonic generation device 31 is arranged such that a distal end surface of the ultrasonic generation device 31 projects from an opening 20a of the inner surface 20S of the fitted portion 20. More specifically, the ultrasonic generator 30 includes an elastic member 33, which is, for example, a spring. The basal end of the ultrasonic generation device 31 is connected to the elastic member 33. Extension and contraction of the elastic member 33 changes the projection amount of the ultrasonic generation device 31 from the opening 20a. Wires (not shown) that connect the ultrasonic generation device 31 and the drive unit 41 to each other run through the fitted portion 20.

The protection sheet 70 is attached to the inner surface 20S of the fitted portion 20 by an adhesive layer 71. It is preferred that the adhesive layer 71 be arranged only between the inner surface 20S of the fitted portion 20 and the protection sheet 70 and not be arranged between the ultrasonic generation device 31 and the protection sheet 70. That is, it is preferred that the ultrasonic generation device 31 be in direct contact with the protection sheet 70. Such a configuration limits situations in which ultrasonics attenuate due to passage through the adhesive layer 71 and thus increases the efficiency for transmitting ultrasonics from the ultrasonic generation device 31 to the container 80. Additionally, it is preferred that the protection sheet 70 be flexible and the protection sheet 70 extend and contract to follow the distal end surface of the ultrasonic generation device 31 in accordance with a change in the projection amount of the ultrasonic generation device 31. When the foaming device 17 is not mounted on the container 80, the ultrasonic generation device 31 has the maximum projection amount and the distal end surface of the ultrasonic generation device 31 is in abutment with the protection sheet 70.

Figure 24:
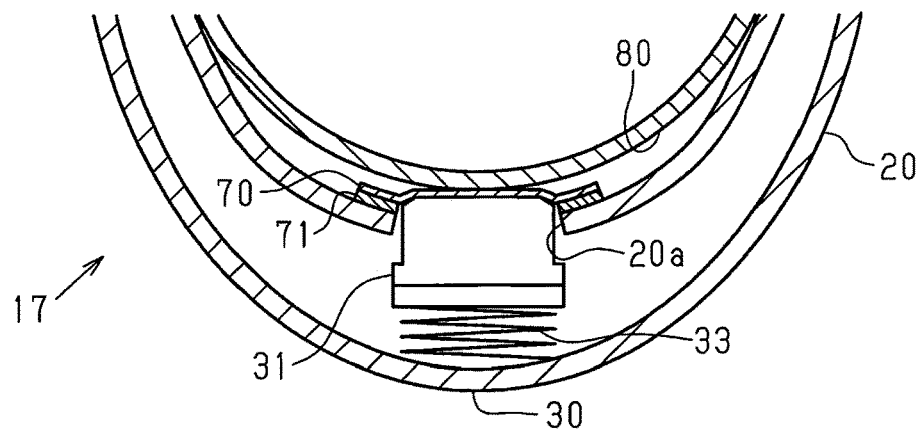
FIG. 24 is a diagram showing the internal construction of the vicinity of the ultrasonic generator in the foaming device according to the modification mounted on a container.

When the foaming device 17 is mounted on the container 80 as shown in FIG. 24, the protection sheet 70, the ultrasonic generation device 31, and the elastic member 33 are pressed from the side surface of the container 80. At this time, the ultrasonic generation device 31 receives a restoring force of the elastic member 33. This causes the ultrasonic generation device 31 and the protection sheet 70 to be pressed against the side surface of the container 80.

Without the arrangement of the elastic member 33, when the ultrasonic generation device 31 excessively projects from the opening 20*a*, especially in a case in which the fitted portion 20 has a small elasticity, it is difficult to mount the fitted portion 20 on the container 80. When the ultrasonic generation device 31 does not project from the opening 20*a*, a gap is formed between the side surface of the container 80 and the ultrasonic generation device 31 after the fitted portion 20 is mounted. This limits the transmission of ultrasonics. In the foaming device 17, when the fitted portion 20 is mounted, the projection amount of the ultrasonic generation device 31 is finely adjusted through the deformation of the elastic member 33. This prevents the formation of a gap between the side surface of the container 80 and the ultrasonic generation device 31 while preventing the projection of the ultrasonic generation device 31 from impeding the mounting of the fitted portion 20. This increases the efficiency for transmitting ultrasonics from the ultrasonic generation device 31 to the container 80.

In the foaming device 17, the protection sheet 70 covers the ultrasonic generation device 31 and its surroundings from the inner side of the fitted portion 20. This prevents the entry of liquid into the vicinity of the ultrasonic generation device 31. To smoothly change the projection amount of the ultrasonic generation device 31, it is preferred that a slight gap be formed between the opening 20*a* and the ultrasonic generation device 31. Even when such a gap is formed, the protection cover 70 covers the ultrasonic generation device 31 and its surroundings from the inner side of the fitted portion 20. This properly prevents the entry of liquid into the vicinity of the ultrasonic generation device 31.

The foaming device 17 does not have to include the elastic member 33, and the position of the ultrasonic generation device 31 may be fixed. Further, the mode in which the projection amount of the ultrasonic generation device 31 from the opening 20*a* can be changed by the elastic member 33 may be applied to a mode that does not include the protection sheet 70, such as each of the above-described embodiments.

Another example of the construction for protecting the ultrasonic generation device 31 from the entry of liquid will now be described.

Figure 25:
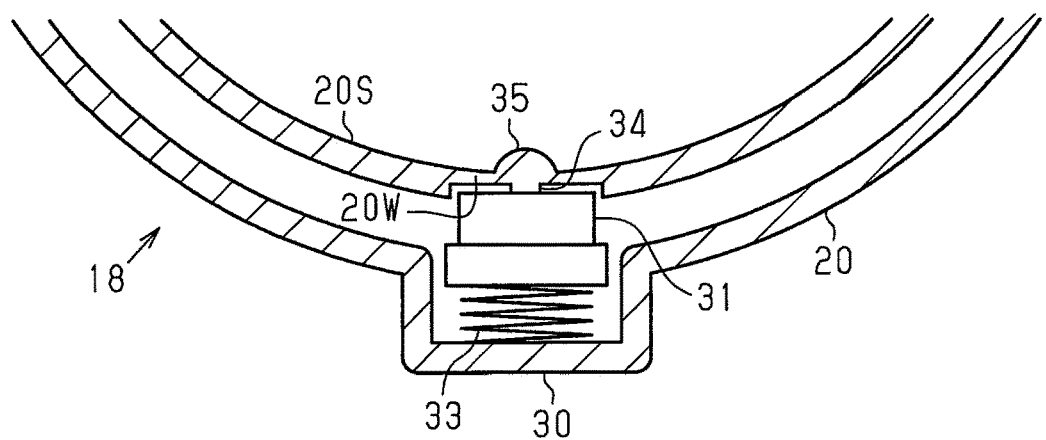
FIG. 25 is a diagram showing the internal construction of the vicinity of the ultrasonic generator in a foaming device according to a modification.

FIG. 25 shows a foaming device 18. In the foaming device 18, the inner surface 20S of the fitted portion 20 does not include the opening 20*a*, and the ultrasonic generation device 31 is constantly accommodated in the fitted portion 20. In other words, the ultrasonic generation device 31 is accommodated inside a housing of the foaming device 18. The ultrasonic generator 30 includes the elastic member 33, an inner protrusion 34, and an outer protrusion 35. The elastic member 33 is, for example, a spring. The inner protrusion 34 protrudes into the fitted portion 20 from a side wall 20W of the fitted portion 20. The outer protrusion 35 protrudes from the side wall 20W of the fitted portion 20 toward the outside of the fitted portion 20. The outer protrusion 35 protrudes out of the inner surface 20S. The part of the side wall 20W of the fitted portion 20 where the inner protrusion 34 and the outer protrusion 35 are located serves as the side wall of the ultrasonic generator 30.

The distal end of the ultrasonic generation device 31 is in contact with the inner protrusion 34, and the basal end of the ultrasonic generation device 31 is connected to the elastic member 33. The ultrasonic generation device 31 is pressed against the inner protrusion 34 by a restoring force of the elastic member 33. The elastic member 33 of this modification is arranged in order to finely adjust the position of the ultrasonic generation device 31 in the fitted portion 20 and cause the ultrasonic generation device 31 to abut against the inner protrusion 34. If the fine adjustment of the position of the ultrasonic generation device 31 is unnecessary, the elastic member 33 does not have to be arranged.

To increase the efficiency for transmitting ultrasonics, it is preferred that the inner protrusion 34 have a columnar shape with a diameter that is smaller than the diameter of the distal end surface of the ultrasonic generation device 31. On the distal end surface of the ultrasonic generation device 31, the ultrasonics to be generated become stronger toward the center of the distal end surface. Thus, the contact of the inner protrusion 34 on the central portion of the distal end surface of the ultrasonic generation device 31 increases the efficiency for transmitting ultrasonics.

The outer protrusion 35 is arranged at a position overlapping the inner protrusion 34 with the side wall 20W of the fitted portion 20 located in between. To increase the efficiency for transmitting ultrasonics, it is preferred that the outer protrusion 35 have a hemispherical shape with a bottom surface located in the inner surface of the fitted portion 20. The side surface of the container 80 is curved. Thus, the efficiency for transmitting ultrasonics is higher in a mode in which the distal end of the outer protrusion 35 is a curved surface and the outer protrusion 35 and the side surface of the container 80 are in point contact with each other than in a mode in which the distal end of the outer protrusion 35 is flat. Further, a hemisphere outer protrusion 35 reduces the damage to the side surface of the container 80 caused by the distal end of the outer protrusion 35 when the outer protrusion 35 contacts the side surface of the container 80.

The inner protrusion 34 and the outer protrusion 35 are, for example, made of the same material as the side wall 20W of the fitted portion 20, and the side wall 20W of the fitted portion 20, the inner protrusion 34, and the outer protrusion 35 are integrally formed.

In the above-described configuration, since the ultrasonic generation device 31 is accommodated inside the fitted portion 20, the entry of liquid into the vicinity of the ultrasonic generation device 31 is prevented. Further, the inner protrusion 34 and the outer protrusion 35 are used to transmit ultrasonics. Thus, even in a mode in which the ultrasonic generation device 31 is not exposed to the outside of the fitted portion 20, a decrease in the efficiency for transmitting ultrasonics is limited.

The construction for preventing the entry of liquid may be arranged at the surroundings of the drive unit 41 and the power supply unit 42 in addition to the surroundings of the ultrasonic generation device 31.

Other Modifications

Figure 26:
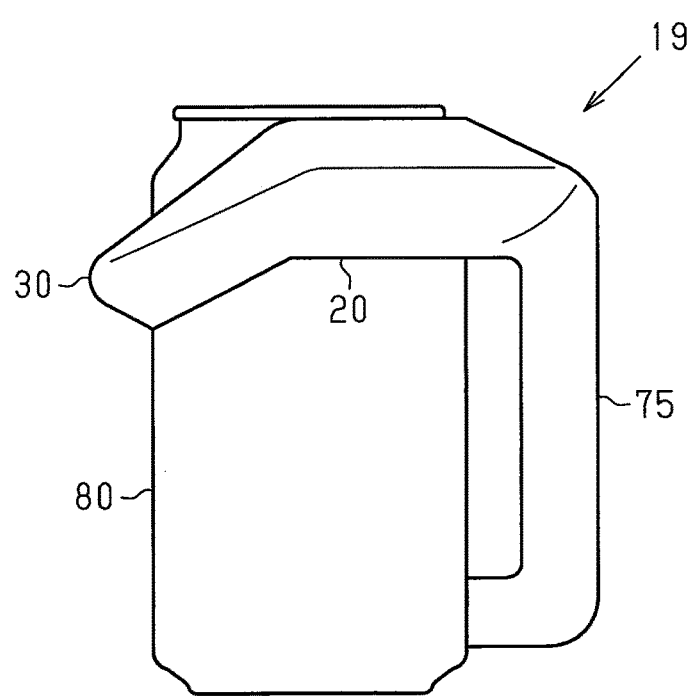
FIG. 26 is a side view showing a foaming device according to a modification.

Like a foaming device 19 shown in FIG. 26, the foaming device 19 may include a grip 75, which functions as a handle. The grip 75 extends downward from the fitted portion 20 with a gap between the grip 75 and the side surface of the container 80. In the configuration in which the foaming device 19 includes the grip 75, the user can hold the foaming device 19 together with the container 80 by gripping the grip 75 with fingers passed through the section between the side surface of the container 80 and the grip 75. Thus, even when the container 80 is large for the fingers of the user, the user can easily hold the foaming device 19 mounted on the container 80. The accommodation portion may also function as the grip 75. Alternatively, the accommodation portion may be located at a position different from that of the grip 75.

The foaming device may include a lower part support that supports the lower part of the container 80. The lower part support may, for example, support the lower lid 82 of the container 80 from below. Alternatively, the lower part support may be fitted to the lower part of the side surface of the container 80 to support the lower part of the container 80. In the construction in which the foaming device includes the lower part support, the position of the foaming device relative to the container 80 is more stable. This limits the separation of the foaming device from the container 80.

The fitted portion 20 simply needs to be fitted to the upper part of the container 80. The fitted portion 20 does not have to be fitted to the recess 81a of the container 80 or may surround the side surface of the container 80 at a position located away from the upper end of the container 80. Further, the fitted portion 20 may have an open annular shape in which part of the ring is incomplete. The fitted portion 20 simply needs to be fitted in the vertical direction from a region in which the distance from the upper end of the container 80 is less than or equal to the half of the entire length of the container 80 (in the case of a can with a large diameter of the upper lid 83) to a region in which the distance is less than or equal to one-third of the entire length of the container 80 (in the case of a can with a large diameter of the upper lid 83)

In the vertical direction, the position of the upper end of the ultrasonic generator 30 may coincide with the position of the upper end of the upper end fitted portion 21. That is, the fitted portion 20 may be arranged over its entire circumference along the upper end of the container 80.

The ultrasonic generator 30 does not have to be part of the fitted portion 20. Instead, the ultrasonic generator 30 may be connected to the fitted portion 20 as a part independent from the fitted portion 20. For example, the fitted portion 20 may only include the upper end fitted portion 21, the upper end fitted portion 21 may have a closed annular shape surrounding the entire circumference of the container 80, and the ultrasonic generator 30 may be connected to the lower part of the upper end fitted portion 21. Alternatively, the accommodation portion may be part of the fitted portion 20. In short, the position of the ultrasonic generator 30 may be defined by the fitting of the container 80 and the fitted portion 20 to each other, and the ultrasonic generator 30 may be arranged in the vertical direction in a region in which the distance from the upper end of the container 80 is less than or equal to the half of the entire length of the container 80.

The foaming device may be mounted on the container 80 so as to cover part of the upper surface of the container 80. When the foaming device is mounted on the container 80, the spout 83a simply needs to be exposed to the outside. For example, a member covering part of the upper surface of the container 80 may be connected to the upper end of the annular fitted portion 20.

The arrangement of each of the drive unit 41, the power supply unit 42, and the operation part 50 may differ from the arrangement of the components in each of the above-described embodiments and the above-described modifications. The accommodation portion simply needs to be arranged in accordance with the positions of the drive unit 41 and the operation part 50.

To sum up the above-described modifications, in short, in the configuration in which the fitting of the container 80 and the fitted portion 20 to each other causes the ultrasonic generator 30 to be arranged in contact with the side surface of the container 80 on the lower side of the spout 83a, other configurations of the foaming device, the shape of each component of the foaming device, and the position of each component of the foaming device may differ from those of each of the above-described embodiments.

The container subject to mounting of the foaming device is not limited to a beverage can and simply needs to be a container including a spout. The containers other than a beverage can include, for example, a bin, a plastic bottle, and a large-capacity beverage tank for business use or the like. The materials of the container include, for example, metal, plastic, and glass. In short, the material and thickness of the container simply need to allow ultrasonics to be propagated from the side surface into an internal beverage, and the fitted portion 20 simply needs to have a shape that allows to be fitted to the upper part of the container in accordance with the shape of the container. Additionally, the intensity of ultrasonics generated by the foaming device simply needs to be adjusted in accordance with the material and thickness of the side wall of the container.

The beverage subject to the application of ultrasonic vibration is not limited to a sparkling beverage. Even beverage that does not contain carbonates may be subject to the application of ultrasonic vibration by the ultrasonic vibration applying device as long as the beverage generates foam when ultrasonic vibration is applied. Additionally, even beverage that does not generate recognizable foam when ultrasonic vibration is applied may be subject to the application of ultrasonic vibration by the ultrasonic vibration applying device as long as the application of ultrasonic vibration contributes to various purposes including the improvement of taste and mouthfeel. In short, beverage in which the application of ultrasonic vibration results in a change in the physical state of the beverage, such as the generation of recognizable foam, the generation of unrecognizable, microscopic foam, and a change in surface tension, can be subject to the application of ultrasonic vibration by the ultrasonic vibration applying device.

Fourth Embodiment

A fourth embodiment of a sparkling beverage foaming device, which is an example of an ultrasonic vibration applying device, will now be described FIGS. 27 to 33.

To further improve the foaming of beverage based on the driving of the ultrasonic vibration applying device, it is desired that the efficiency for propagating ultrasonics to the beverage be increased. When the container 80 is a beverage can, a partial shape and a partial hardness of the surface of the container 80 are not constant in the side surface of the container 80. Thus, when a change occurs in the position in the side surface of the container 80 where ultrasonic vibration is applied, a change may also occur in the efficiency for propagating ultrasonics to beverage. Thus, in terms of increasing the efficiency for propagating ultrasonics, there is still room for improvement of the application position of ultrasonic vibration in the side surface of the container 80. The purpose of the fourth embodiment is to provide an ultrasonic vibration applying device capable of increasing the efficiency for propagating ultrasonics to beverage.

Figure 27:
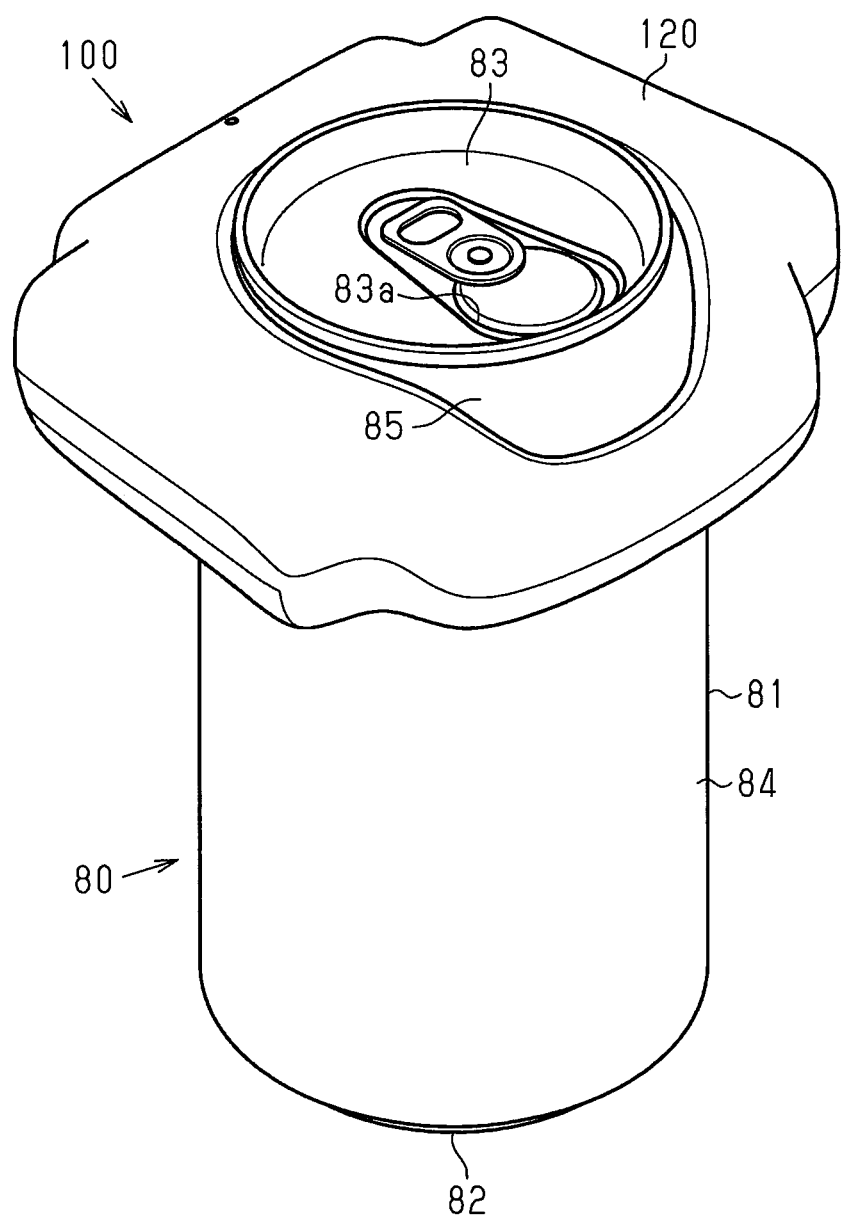
FIG. 27 is a perspective view showing an example of a foaming device together with a container on which the foaming device is mounted according to a fourth embodiment of an ultrasonic vibration applying device.

As shown in FIG. 27, in the fourth embodiment, the container 80 is a beverage can. The container 80 may be a three-piece can or a two-piece can. A three-piece can is formed by separately forming the main part 81, the lower lid 82, and the upper lid 83 and then joining these members to each other. A two-piece can is formed by joining the upper lid 83 to a structure including the main part 81 and the lower lid 82 that are integrally formed. The main part 81 includes a body 84, which has a fixed diameter and extends in the vertical direction, and a shoulder 85, which extends from the upper end of the body 84 toward the upper lid 83 while changing in diameter. The diameter of the main part 81 is the maximum at the body 84.

A foaming device 100 of the fourth embodiment includes an annular fitted portion 120. When the fitted portion 120 is fitted to the upper part of the container 80, the foaming device 100 is mounted on the container 80. With the foaming device 100 mounted on the container 80, the fitted portion 120 extends over the shoulder 85 and the body 84 to surround the outer circumferential surface of the container 80.

Detailed Configuration of Foaming Device

The detailed configuration of the foaming device 100 will now be described with reference to FIGS. 28 to 31.

Figure 28:
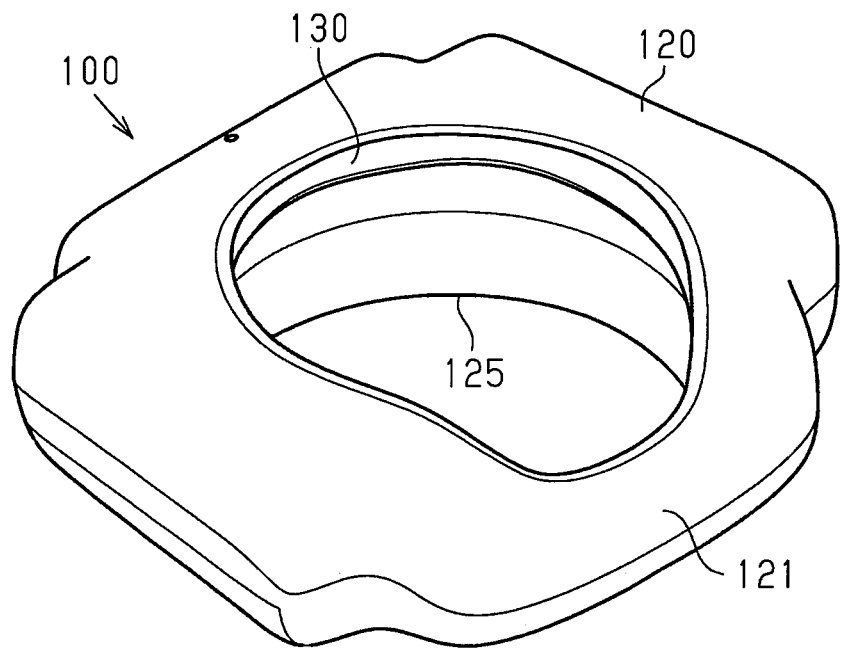
FIG. 28 is a perspective view showing the foaming device of the fourth embodiment.

As shown in FIG. 28, the fitted portion 120 has a closed annular shape and defines an opening 125, through which the container 80 is inserted. The fitted portion 120 is made of, for example, plastic, and internally accommodates various electronic components required for driving the foaming device 100.

The fitted portion 120 includes a front part 121. With the foaming device 100 mounted on the container 80, the front part 121 is arranged at a portion of the fitted portion 120 facing a region immediately below the spout 83a of the container 80, that is, arranged in the same direction as the spout 83a with respect to the center axis of the main part 81. The upper end of the front part 121 is located below the upper end of a portion of the fitted portion 120 other than the front part 121. That is, the upper edge of the opening 125 is dented so as to be lower than other portions at the front part 121.

The fitted portion 120 includes an extension piece 130, which extends downward and overhangs toward the inner side in the radial direction at the upper end of the fitted portion 120. The extension piece 130 is arranged only in the proximity of the upper end of the fitted portion 120. The diameter of the opening 125 is smaller in the portion where the extension piece 130 is located than in other portions.

Figure 29:
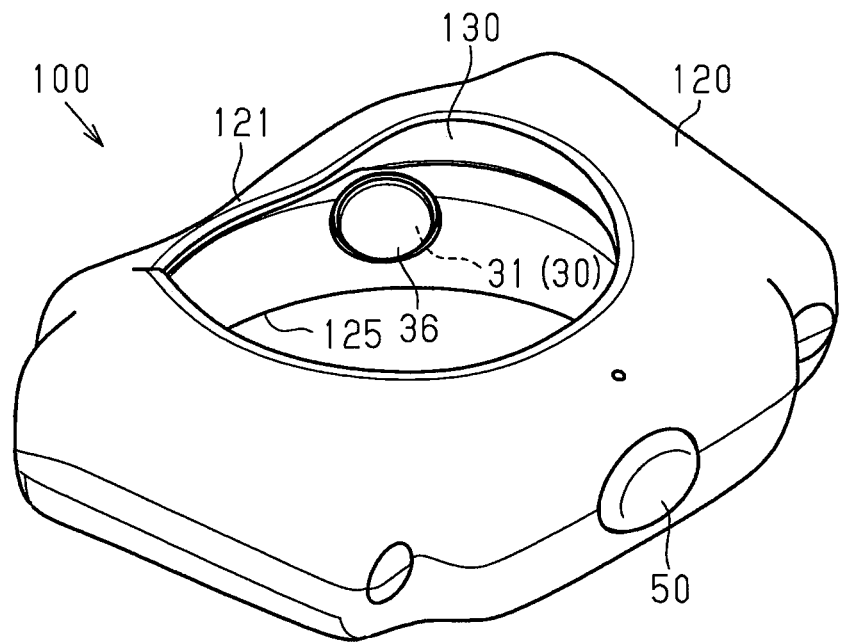
FIG. 29 is a perspective view showing the foaming device of the fourth embodiment.

As shown in FIG. 29, the ultrasonic generation device 31 incorporated in the ultrasonic generator 30 is accommodated in the fitted portion 120 and includes an ultrasonic propagation surface 36, which is, for example, circular. The ultrasonic propagation surface 36 is exposed toward the inside of the opening 125 from the portion of the fitted portion 120 adjacent to the front part 121 in the circumferential direction. The ultrasonic propagation surface 36 is located on the lower side of the extension piece 130. The ultrasonic propagation surface 36 is the outermost surface of the ultrasonic generation device 31 and is used to be in contact with a subject to which ultrasonic vibration is applied. In the fourth embodiment, the ultrasonic generator 30 does not include the ultrasonic propagation member 32, and the ultrasonic generation device 31 is in direct contact with the side surface of the container 80.

The operation part 50 is located on the opposite side of the center axis of the ring of the fitted portion 120 from the front part 121. The operation part 50 projects from the fitted portion 120 toward the outside in the radial direction.

Figure 30:
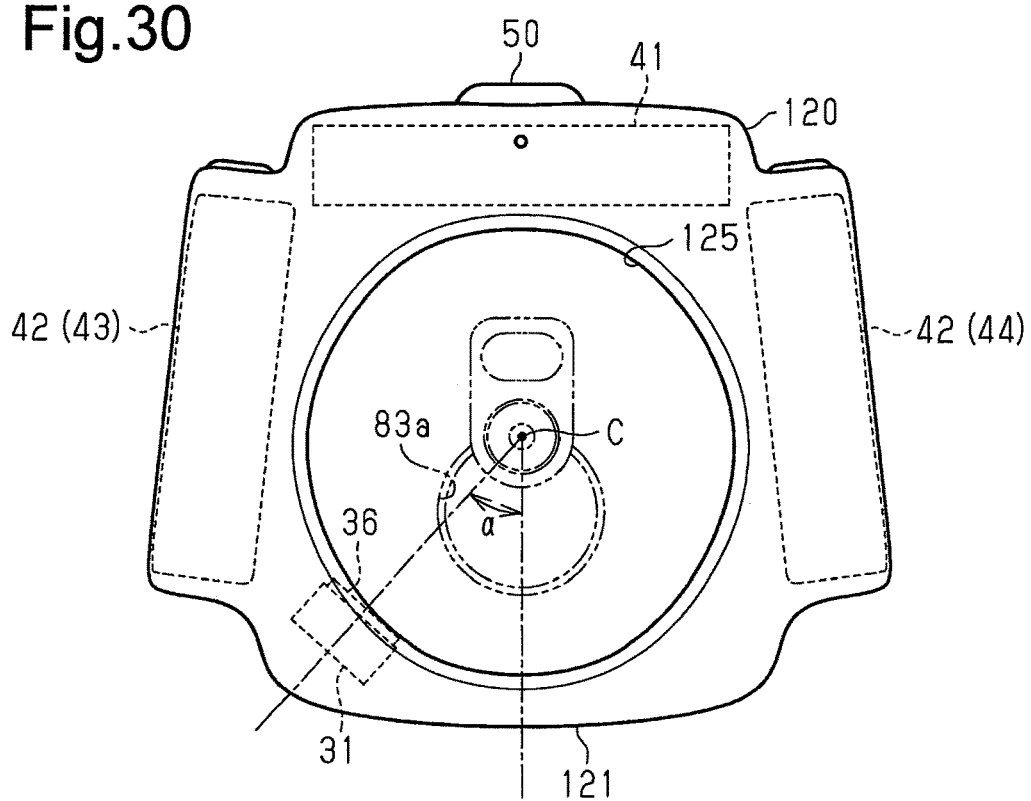
FIG. 30 is a plan view showing the foaming device of the fourth embodiment.

As shown in FIG. 30, the fitted portion 120 internally accommodates the above-described ultrasonic generation device 31 and the drive unit 41. Further, the fitted portion 120 internally includes the power supply unit 42. The fourth embodiment includes, as an example, a mode in which the power supply unit 42 includes a first accommodation chamber 43 and a second accommodation chamber 44 and each of the accommodation chambers 43 and 44 is configured to accommodate one dry battery.

The first accommodation chamber 43 and the second accommodation chamber 44 are located at positions facing with each other with the opening 125 located in between. In other words, the second accommodation chamber 44 is located on the opposite side of the center axis C of the ring of the fitted portion 120 from the first accommodation chamber 43. In the fitted portion 120, the front part 121 is located between the portion including the first accommodation chamber 43 and the portion including the second accommodation chamber 44. That is, the first accommodation chamber 43 and the second accommodation chamber 44 are located on the left and right of the container 80, respectively.

The drive unit 41 is accommodated in the portion located on the opposite side of the center axis C from the front part 121. That is, the drive unit 41 is located in the proximity of the operation part 50. In this manner, in the fitted portion 120, the first accommodation chamber 43, the ultrasonic generation device 31, the second accommodation chamber 44, and the drive unit 41 are arranged in this order in the circumferential direction.

The outer shape of the fitted portion 120 as viewed in the direction corresponding to the center axis C is not particularly limited. The drawings illustrate a mode in which the fitted portion 120 has an outer shape bulged toward the outside along the shapes of the accommodation chambers 43 and 44 at the portions of the first accommodation chamber 43 and the second accommodation chamber 44. Instead, the outer shape of the fitted portion 120 may be circular, oval, or rectangular.

The position of the ultrasonic generation device 31 as viewed in the direction corresponding to the center axis C will now be described in detail. The center axis C coincides with the center axis of the main part 81 of the container 80.

When the direction in which the front part 121 is located with respect to the center axis C as viewed in the direction corresponding to the center axis C (i.e., as viewed in the position facing the upper surface of the upper lid 83) is referred to as a frontward direction and the direction in which the ultrasonic generation device 31 is located with respect to the center axis C is referred to as an arrangement direction, the frontward direction and the arrangement direction differ from each other. When the container 80 is tilted to apply ultrasonic vibration to a sparkling beverage that accumulates in the vicinity of the spout 83a, in order to increase the efficiency for propagating ultrasonics to the sparkling beverage, it is preferred that angle α formed by the frontward direction and the arrangement direction be less than or equal to 50°.

In the frontward direction, the spout 83a is located with respect to the center axis C as viewed in the direction corresponding to the center axis C with the foaming device 100 mounted on the container 80, that is, with the fitted portion 120 and the container 80 fitted to each other. More specifically, in the frontward direction, the center of the spout 83a is located with respect to the center axis C. In the arrangement direction, the center of the ultrasonic propagation surface 36 is located with respect to the center axis C as viewed in the direction corresponding to the center axis C.

In this manner, the ultrasonic generation device 31 is arranged such that the fitting of the fitted portion 120 and the container 80 to each other causes the ultrasonic generation device 31 to be in contact with the side surface of the container 80 at a position located around the lower side of the spout 83a and deviated from the immediately lower part of the spout 83a, that is, at a position diagonally downward of the spout 83a.

Figure 31:
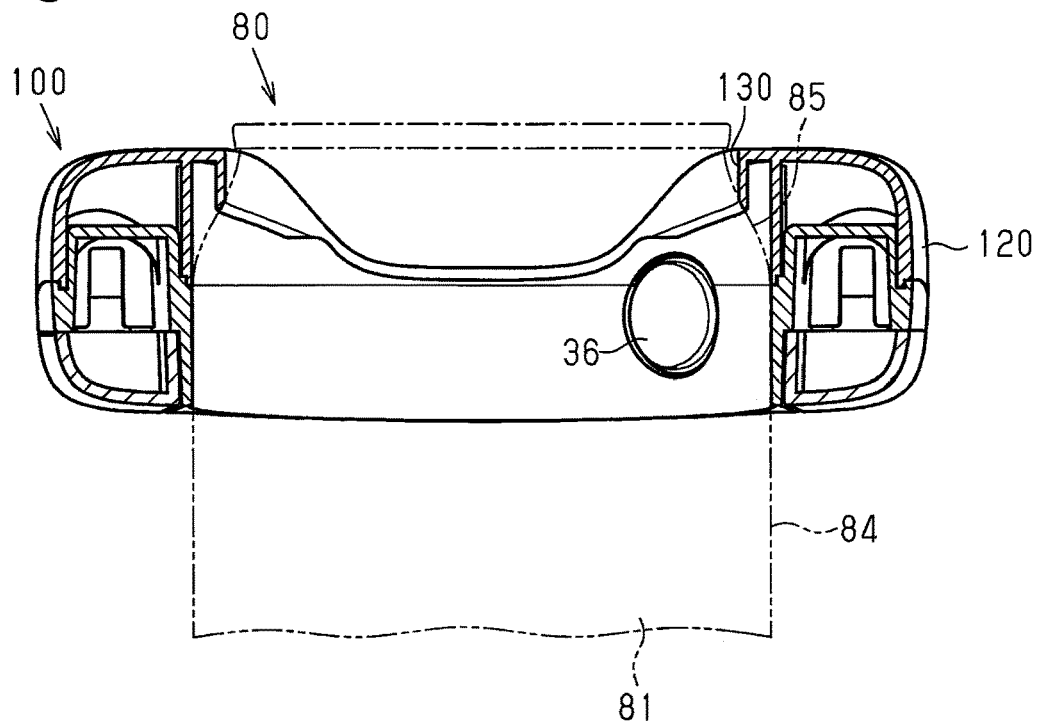
FIG. 31 is a cross-sectional view showing the foaming device of the fourth embodiment.

As shown in FIG. 31, with the foaming device 100 mounted on the container 80, the lower end of the extension piece 130 is in abutment with the shoulder 85 of the container 80. On the lower side of the extension piece 130, the inner circumferential surface of the fitted portion 120 is in contact with the body 84 of the container 80.

When the fitted portion 120 is fitted to the container 80 from the upper side of the container 80, the lower end of the extension piece 130 abuts against the shoulder 85. This causes the foaming device 100 to be engaged with the container 80 and defines the position of the foaming device 100 relative to the position of the container 80 in the vertical direction. Thus, the position of the ultrasonic generation device 31 relative to the container 80 in the vertical direction is determined. With the foaming device 100 mounted on the container 80, the position of the upper end of the fitted portion 120 in the vertical direction coincides with the position of the upper end of the main part 81 in the vertical direction at a portion excluding the vicinity of the spout 83a.

The front part 121 is not provided with the extension piece 130, and the inner circumferential surface of the front part 121 is entirely in contact with the body 84. In the vertical direction, the position of the upper end of the front part 121 coincides with the position of the upper end of the body 84 or is located on the lower side of the position of the upper end of the body 84.

The position of the ultrasonic generation device 31 in the vertical direction with the foaming device 100 mounted on the container 80 will now be described in detail with reference to FIG. 32.

The ultrasonic generation device 31 is arranged at a position adjacent to the vicinity of the upper end of the body 84 and the vicinity of the lower end of the shoulder 85. That is, as viewed in a sideward direction, which opposes the surface of the body 84 and in which the ultrasonic generation device 31 is located frontward, the ultrasonic generation device 31 overlaps the portion of the main part 81 extending over the body 84 and the shoulder 85.

More specifically, the shoulder 85 includes a diameter-decreasing part 86, which is inclined at a predetermined angle with respect to the vertical direction, and a boundary part 87, which is located between the diameter-decreasing part 86 and the body 84. The diameter-decreasing part 86 is tapered. The diameter of the diameter-decreasing part 86 gradually decreases from the body 84 toward the upper lid 83, that is, from the lower end toward the upper end of the diameter-decreasing part 86. The boundary part 87 is curved with a curvature in the cross section in the vertical direction to gently connect the upper end of the body 84 to the lower end of the diameter-decreasing part 86.

As viewed in the sideward direction, the ultrasonic propagation surface 36 of the ultrasonic generation device 31 overlaps the boundary part 87 and the vicinity of the upper end of the body 84. That is, the ultrasonic propagation surface 36 is in contact with the side surface of the container 80 at the boundary part 87 or in the proximity of the boundary part 87. For example, the ultrasonic propagation surface 36 is a flat surface extending in the vertical direction, is arranged along the body 84, and is in contact with the vicinity of the upper end of the body 84 and the lower end of the boundary part 87.

The main part 81 is formed by plastically deforming a metal sheet (for example, drawing). This deformation causes a great stress to act on the boundary part 87 and its vicinity and results in strain hardening. Thus, the boundary part 87 and its vicinity are harder than other portions of the main part 81, particularly, harder than the portions of the body 84 excluding its ends.

When the user holds the container 80 with the spout 83a open, the body 84 of the main part 81 easily deforms. In some cases, a slight recess is formed in the surface of the body 84. If the ultrasonic propagation surface 36 is located at such a recess, a gap is formed between the side surface of the container 80 and the ultrasonic propagation surface 36. This reduces the adherence of the container 80 and the ultrasonic propagation surface 36 and thus limits the transmission of ultrasonics to the container 80.

In the fourth embodiment, the ultrasonic propagation surface 36 is in contact with a relatively hard portion of the main part 81, that is, a portion of the main part 81 that resists deforming. This prevents the adherence of the container 80 and the ultrasonic propagation surface 36 from decreasing due to a recess in the surface of the container 80. Thus, the ultrasonics generated by the ultrasonic generation device 31 are easily transmitted through the main part 81 to a sparkling beverage in the container 80. This increases the efficiency for propagating ultrasonics to a sparkling beverage.

Additionally, the ultrasonic propagation surface 36 generates ultrasonics most strongly at its central portion. Since the adherence of the container 80 and the ultrasonic propagation surface 36 is prevented from decreasing as described above, the central portion of the ultrasonic propagation surface 36 is easily in close contact with the main part 81. This also increases the efficiency for propagating ultrasonics to a sparkling beverage.

Method for Using Foaming Device

The foaming device 100 of the fourth embodiment is used in the same manner as the first embodiment. That is, after mounting a deactivated foaming device 100 on the container 80, the user lifts the foaming device 100 and the container 80, tilts the foaming device 100 and the container 80 such that the spout 83a is located on the lower side, and pours the sparkling beverage Lq, which is liquid, into the cup 90.

Figure 33:
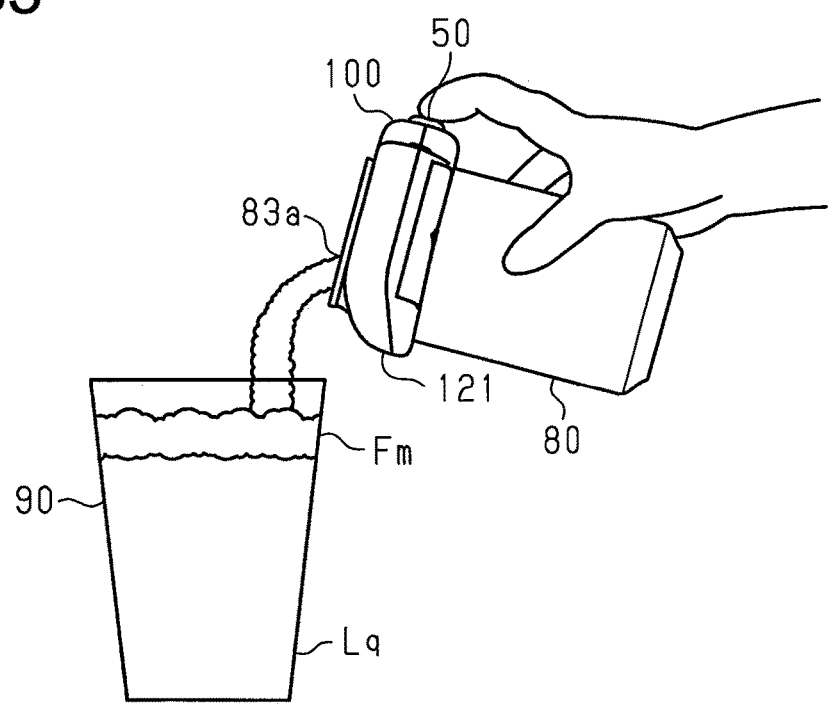
FIG. 33 is a diagram showing a mode of using the foaming device of the fourth embodiment.

As shown in FIG. 33, at the point in time at which a suitable amount of the sparkling beverage Lq is poured into the cup 90, the user operates the operation part 50 to switch the foaming device 100 on. This causes the ultrasonic generation device 31 to generate ultrasonics to foam the sparkling beverage in the container 80, thereby pouring the foam Fm from the spout 83a into the cup.

In the fourth embodiment, the foaming device 100 is located only on the outer circumference of the upper part of the container 80. Thus, the central portion and the lower part of the container 80 are exposed from the foaming device 100. Thus, the user supports the structure including the foaming device 100 and the container 80 by holding only the container 80 at the vicinity of the central portion of the container 80. Accordingly, as compared to when the container 80 is held together with the foaming device 100, the above-described structure is easy to hold and operate.

Further, in a configuration in which the ultrasonic propagation surface 36 is exposed from the portion adjacent to the front part 121 and is in contact with the main part 81, when the container 80 is tilted such that beverage is poured from the spout 83a, the ultrasonic propagation surface 36 is located on the lower side of the vicinity of the spout 83a, that is, the ultrasonic propagation surface 36 is located in the vicinity of the part of the container 80 where the sparkling beverage accumulates. Therefore, the ultrasonics generated from the ultrasonic generation device 31 are properly transmitted to the sparkling beverage in the container 80.

In addition, the front part 121, which is in contact with the region of the container 80 located immediately below the spout 83$a$, is located away from the upper end of the container 80. Thus, as compared to a configuration in which the front part 121 is in contact with the upper end of the container 80, the collection of beverage flowing out of the spout 83$a$ on the front part 121 is limited. Accordingly, the burden on the management of the foaming device 100 is further reduced. In the fourth embodiment, the ultrasonic generation device 31 is not arranged on the front part 121 but on the portion adjacent to the front part 121. This allows ultrasonics to be applied to the vicinity of the boundary part 87 in the proximity of the spout 83$a$. This also causes the front part 121, which is located immediately below the spout 83$a$, to be arranged on the lower side of the boundary part 87 and thus limits the collection of beverage on the foaming device 100. In addition, as compared to when the ultrasonic generation device 31 is accommodated in the front part 121, the thickness of the front part 121 in the radial direction can be reduced. This limits the collection of beverage on the front part 121.

Further, in the foaming device 100 of the fourth embodiment, the first accommodation chamber 43, the ultrasonic generation device 31, the second accommodation chamber 44, and the drive unit 41 are arranged in this order in the circumferential direction of the fitted portion 120 to surround the container 80, and the second accommodation chamber 44 is arranged on the opposite side of the center axis C from the first accommodation chamber 43. The first accommodation chamber 43 and the second accommodation chamber 44 are relatively heavy in the foaming device 100 when accommodating a dry battery. Thus, if the first accommodation chamber 43 and the second accommodation chamber 44 are located in the same direction with respect to the center axis C, the center of gravity of the structure including the foaming device 100 and the container 80 is biased to one side of the center axis C. For example, when the container 80 becomes empty and then the above-described structure is placed on a horizontal surface, the structure easily falls. In the fourth embodiment, the second accommodation chamber 44 is located on the opposite side of the center axis C from the first accommodation chamber 43. This limits the biasing of the center of gravity of the structure and thus limits the falling of the structure.

Additionally, in the foaming device 100 of the fourth embodiment, the foaming device 100 can be mounted on different types of containers 80 having different lengths in the vertical direction in the same manner without adjusting, for example, the length of each part of the foaming device 100.

As described above, the fourth embodiment provides the following advantages in addition to advantage (1) of the first embodiment.

(11) With the container 80 and the fitted portion 120 fitted to each other, the ultrasonic generation device 31 overlaps the boundary part 87 as viewed in the sideward direction. In this construction, the ultrasonic generation device 31 is in contact with the relatively hard portion of the main part 81. This prevents the adherence of the container 80 and the ultrasonic generation device 31 from decreasing due to deformation of the container 80. Thus, the efficiency for propagating ultrasonics to beverage is increased.

(12) With the container 80 and the fitted portion 120 fitted to each other, the ultrasonic generation device 31 overlaps the body 84 the boundary part 87 as viewed in the sideward direction. This construction facilitates the setting of an arrangement angle of the ultrasonic generation device 31 to cause the ultrasonic generation device 31 to be in contact with the side surface of the container 80. Also, this construction allows the contact area of the ultrasonic generation device 31 and the container 80 to be easily obtained.

(13) With the container 80 and the fitted portion 120 fitted to each other, the frontward direction differs from the arrangement direction. Thus, as compared to a mode in which these two directions coincide with each other, the degree of freedom for the arrangement of the front part 121 in the vertical direction is increased. Further, the upper end of the front part 121 is located below the upper ends of other parts of the fitted portion 120. Thus, the front part 121, which is in contact with the part of the fitted portion 120 located immediately below the spout 83$a$, is located away from the upper end of the container 80 as compared to the other parts. This limits the collection of beverage flowing out of the spout 83$a$ on the foaming device 100 and thus reduces the burden on the management of the foaming device 100.

(14) The second accommodation chamber 44 is located on the opposite side of the center axis C of the fitted portion 120 from the first accommodation chamber 43. Thus, the two accommodation chambers 43 and 44, which are relatively heavy because of the accommodation of a dry battery, are arranged with the center axis C in between. This limits situations in which the center of gravity of the structure including the foaming device 100 and the container 80 is biased to one side of the center axis C. Thus, the falling of the above-described structure when the structure is placed on a horizontal surface is limited.

Modifications

The above-described fourth embodiment may be modified as follows.

Figure 34:
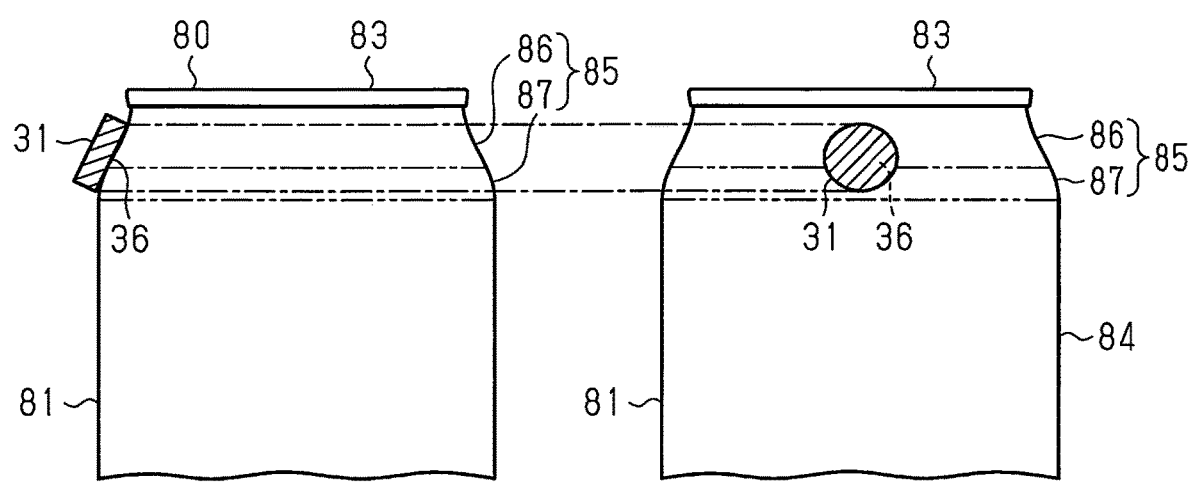
FIG. 34 is a diagram showing the position of the ultrasonic generation device in a foaming device according to a modification.

As shown in FIG. 34, the ultrasonic generation device 31 may be arranged at a position adjacent to the shoulder 85. That is, as viewed in the sideward direction, the ultrasonic propagation surface 36 may overlap the shoulder 85.

More specifically, as viewed in the sideward direction, the ultrasonic propagation surface 36 of the ultrasonic generation device 31 overlaps the diameter-decreasing part 86 and the boundary part 87. That is, the ultrasonic propagation surface 36 is in contact with the side surface of the container 80 at the boundary part 87 or in the proximity of the boundary part 87. For example, the ultrasonic propagation surface 36 is arranged along the inclined surface of the diameter-decreasing part 86 to be in contact with the diameter-decreasing part 86 and the upper end of the boundary part 87.

Even in the above-described configuration, the ultrasonic propagation surface 36 is in contact with the relatively hard portion of the main part 81, that is, the portion of the main part 81 that resists deforming. This prevents the adherence of the container 80 and the ultrasonic propagation surface 36 from decreasing due to a recess in the surface of the container 80. Further, the central portion of the ultrasonic propagation surface 36 is easily in close contact with the main part 81. This increases the efficiency for propagating ultrasonics to a sparkling beverage.

The ultrasonic propagation surface 36 may overlap the body 84, the boundary part 87, and the diameter-decreasing part 86. In short, as viewed in the sideward direction, at least part of the ultrasonic propagation surface 36 simply needs to overlap the boundary part 87. For example, as viewed in the sideward direction, the upper end of the ultrasonic propagation surface 36 may overlap the lower end of the boundary part 87, or the lower end of the ultrasonic propagation surface 36 may overlap the upper end of the boundary part 87.

The ultrasonic propagation surface 36 may be tilted at an angle at which the ultrasonic propagation surface 36 is in contact with the curve of the boundary part 87.

The ultrasonic generation device 31 may be partially or entirely accommodated in the front part 121. For example, the frontward direction may coincide with the arrangement direction. That is, in the same manner as the first embodiment, the ultrasonic generation device 31 may be arranged such that the fitting of the fitted portion 120 and the container 80 to each other causes the ultrasonic generation device 31 to contact the side surface of the container 80 immediately below the spout 83a. Further, in the vertical direction, the position of the upper end of the front part 121 may coincide with the position of the upper end of the main part 81 of the container 80.

The fitted portion 120 simply needs to be allowed to be fitted to the upper part of the container 80. The fitted portion 120 does not need to have a closed annular shape and may have an open annular shape. For example, the fitted portion 120 does not have to include the front part 121 and may have an annular shape in which the ring is incomplete at a part corresponding to the front part 121.

The construction for engaging the fitted portion 120 with the container 80, that is, the construction for positioning the ultrasonic generation device 31 in the vertical direction, is not limited to the engagement construction using the extension piece 130. For example, the foaming device 100 may have a construction in which the foaming device 100 is hooked to the upper lid 83 or the lower part of the main part 81 in the container 80, and the engagement of the foaming device 100 with the container 80 using this construction may define the position of the ultrasonic generation device 31 in the vertical direction.

In short, the position of the ultrasonic generation device 31 in the vertical direction simply needs to be determined by the fitting of the fitted portion 120 and the container 80 to each other such that the ultrasonic propagation surface 36 is in contact with the surroundings of the lower side of the spout 83a in the outer circumferential surface of the main part 81 and the boundary part 87 overlaps the ultrasonic propagation surface 36 at the position in the vertical direction.

In some cases, when a sparkling beverage is poured from the container 80, the beverage collects on the upper lid 83. Thus, in terms of limiting the collection of a sparkling beverage on the foaming device 100, it is preferred that the foaming device 100 be arranged only on the outer circumference of the main part 81.

The appearance of the foaming device 100 may be the same as that of any one of the first to third embodiments and their modifications. For example, the foaming device 100 may include the fitted portion 120 and an accommodation portion that extends downward from the fitted portion 120, and the accommodation portion may accommodate the drive unit 41 and the power supply unit 42.

The foaming device 100 may include a mechanism capable of adjusting the position of the ultrasonic generation device 31 in the vertical direction such that the foaming device 100 can be mounted on multiple types of containers 80 having different positions of the boundary part 87 in the vertical direction.

In the container 80, which is a beverage can, the diameter-decreasing part 86 is not limited to a shape that continuously decreases in diameter but may have a shape that decreases in diameter in a stepwise manner. That is, the diameter-decreasing part 86 may have stepped recesses and projections and simply needs to decrease in diameter from the body 84 toward the upper surface of the container 80 as a whole. In addition, the diameter-decreasing part 86 is not limited to a shape that decreases in diameter while tilting at the predetermined angle. Instead, the diameter-decreasing part 86 may have a shape that decreases in diameter while being curved, that is, while having a curvature in the cross section in the vertical direction. The boundary part 87 is an angular part curved with a curvature between the diameter-decreasing part 86 and the body 84. Depending on the shape of the diameter-decreasing part 86, the diameter-decreasing part 86 and the body 84 may be directly connected to each other. In this case, the boundary part 87 is a linear part located at the boundary between the diameter-decreasing part 86 and the body 84 to extend in the circumferential direction.

The beverage subject to the application of ultrasonic vibration is not limited to a sparkling beverage and simply needs to be beverage filling a beverage can. Even beverage that does not contain carbonates may be subject to the application of ultrasonic vibration by the ultrasonic vibration applying device as long as the beverage generates foam when ultrasonic vibration is applied. Additionally, even beverage that does not generate recognizable foam when ultrasonic vibration is applied may be subject to the application of ultrasonic vibration by the ultrasonic vibration applying device when, for example, the application of ultrasonic vibration contributes to various purposes including the improvement of taste and mouthfeel. Even in such a subject, the purpose of the application of ultrasonic vibration is achieved in a favorable manner by increasing the efficiency for propagating ultrasonics to beverage. In short, beverage in which the application of ultrasonic vibration results in a change in the physical state of the beverage, such as the generation of recognizable foam, the generation of unrecognizable, microscopic foam, and a change in surface tension, can be subject to the application of ultrasonic vibration by the ultrasonic vibration applying device.

Supplementary Claims

The means for solving the above-described problem includes the following items as the technical ideas obtainable from the fourth embodiment and its modifications.

1. An ultrasonic vibration applying device configured to be mounted on a beverage can including a spout on an upper surface, the beverage can including a body that has a fixed diameter and extends in a vertical direction and a diameter-decreasing part that decreases in diameter from the body toward the upper surface, the ultrasonic vibration applying device comprising:

an annular fitted portion configured to be fitted to an upper part of the container; and an ultrasonic generator configured to be arranged at a position that is in contact with a vicinity of a lower side of the spout in a side surface of the beverage can by fitting the container and the fitted portion to each other, wherein the ultrasonic generator is configured to overlap a boundary part of the body and the diameter-decreasing part as viewed in a sideward direction which opposes a surface of the body and in which the ultrasonic generator is located frontward when the beverage can and the fitted portion are fitted to each other.

2. The ultrasonic vibration applying device according to item 1, wherein the ultrasonic signal applying device is configured such that a direction in which a center of the spout is located with respect to a center axis of the fitted portion differs from a direction in which the ultrasonic generator is located with respect to the center axis when the beverage can and the fitted portion are fitted to each other.

3. The ultrasonic vibration applying device according to item 2, wherein the fitted portion is configured such that an upper end of a portion of the fitted portion located in a same direction as the center of the spout with respect to the center axis is located on a lower side of an upper end of the remaining section of the fitted portion in the vertical direction when the beverage can and the fitted portion are fitted to each other.

4. The ultrasonic vibration applying device according to item 1, wherein the fitted portion includes a first accommodation chamber and a second accommodation chamber that accommodate a battery, and the second accommodation chamber is located on an opposite side of a center axis of the fitted portion from the first accommodation chamber.

EXAMPLES

The above-described foaming devices will now be described using specific examples. Foaming devices of three examples having different positions of the ultrasonic generation device were prepared to evaluate the degree of foaming in beverage. The containers on which the foaming devices were mounted are beverage cans.

Example 1

Figure 32:
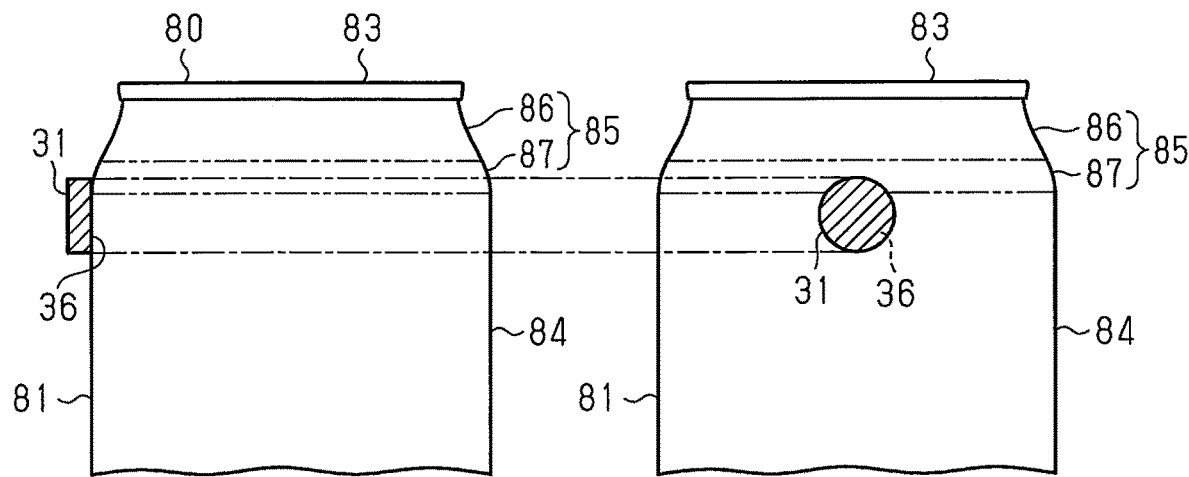
FIG. 32 is a diagram showing the position of the ultrasonic generation device in the foaming device of the fourth embodiment.

Example 1 corresponds to the mode shown in FIG. 32. As viewed in the sideward direction, the ultrasonic propagation surface of the ultrasonic generation device overlaps the boundary part and the vicinity of the upper end of the body in the beverage can. The ultrasonic propagation surface is a flat surface extending in the vertical direction and is arranged along the body. The ultrasonic generation device is in direct contact with the beverage can. In example 1, the angle formed by the frontward direction and the arrangement direction is 30°.

Example 2

Example 2 corresponds to the mode shown in FIG. 34. As viewed in the sideward direction, the ultrasonic propagation surface of the ultrasonic generation device overlaps the diameter-decreasing part and the boundary part in the beverage can. The ultrasonic propagation surface is a flat surface along the tilt of the diameter-decreasing part and is arranged along the diameter-decreasing part. The ultrasonic generation device is in direct contact with the beverage can. In example 2, the frontward direction is the same as the arrangement direction.

Example 3

In the foaming device of example 3, as viewed in the sideward direction, the ultrasonic propagation surface of the ultrasonic generation device is located below the boundary part and overlaps the body. The ultrasonic propagation surface is a flat surface extending in the vertical direction and is arranged along the body. The ultrasonic generation device is in direct contact with the beverage can. In example 3, the frontward direction is the same as the arrangement direction.

Evaluation Method

The foaming device of each example was mounted on a beverage can containing beer. The capacity of the beverage can was 350 ml. In each example, after 80% of the content (i.e., 280 ml of beer) was poured from the beverage can into a cup with the foaming device off, 20% of the content (i.e., 70 ml of beer) was further poured from the beverage can into the cup with the foaming device switched on. The height of the increased amount in the vertical direction after the foaming device was switched on in the beer contained in the cup was measured for the liquid part and the foam part.

Evaluation Result

Table 1 shows the measurement result of the height of the increased amount in each example.

TABLE 1

| | Height of Increased Amount | | |
| --- | --- | --- | --- |
| | Liquid | Foam | Evaluation |
| Example 1 | 0 mm | 20 mm | Excellent |
| Example 2 | 0 mm | 20 mm | Excellent |
| Example 3 | 5 mm | 10 mm | Good |

As shown in Table 1, whereas the liquid part was mixed with the beverage poured when the foaming device was on in example 3, the beverage poured when the foaming device was on was all foam in examples 1 and 2. It was acknowledged that whereas the half or more of beverage could be foamed and released in example 3, foaming could be done in a more favorable manner in examples 1 and 2. That is, it was indicated that the efficiency for propagating ultrasonics to beverage could be increased by arranging the ultrasonic generation device so as to overlap the boundary part of the beverage can.

DESCRIPTION OF THE REFERENCE NUMERALS 10, 11, 12, 13, 14, 15, 16, 17, 18, 19, 100) Foaming Device; 20, 120) Fitted Portion; 21) Upper End Fitted Portion; 21a) Projection; 30) Ultrasonic Generator; 31) Ultrasonic Generation Device; 32) Ultrasonic Propagation Member; 33) Elastic Member; 34) Inner Protrusion; 35) Outer Protrusion; 36) Ultrasonic Propagation Surface; 40, 45, 46, 49) Accommodation Portion; 41) Drive Unit; 42) Power Supply Unit; 43) First Accommodation Chamber; 44) Second Accommodation Chamber; 47) Internal Part; 48) Exterior Part; 50) Operation Part; 51) Depression; 52) Support; 60) Display; 70) Protection Sheet; 71) Adhesive Layer; 75) Grip; 80) Container; 81) Main Part; 81a) Recess; 82) Lower Lid; 83) Upper Lid; 83a) Spout; 84) Body; 85) Shoulder; 86) Diameter-Decreasing Part; 87) Boundary Part; 90) Cup; 121) Front Part; 125) Opening; 130) Extension Piece

The invention claimed is:

1. An ultrasonic vibration applying device configured to be mounted on a container that contains a beverage and includes a spout at an upper part of the container, the ultrasonic vibration applying device comprising:

an annular fitted portion having an opening through which the upper part of the container can be inserted and removed for attachment and detachment of the annular fitted portion over the upper part of the container; and an ultrasonic generator configured to be arranged at a position in contact with a side surface of the container and directly below the spout when the annular fitted portion is in attachment with the container, wherein when the annular fitted portion is in attachment with the container and the container is in a pouring tilt position, the annular fitted portion causes the ultrasonic generator to remain in contact with the side surface of the container and in position directed below the spout, for allowing foaming of the beverage by generating ultrasonics during pouring of the beverage from the spout.

2. The ultrasonic vibration applying device according to claim 1, wherein
the container is a beverage can, and
the opening of the annular fitted portion has a shape that allows the annular fitted portion to be inserted over the upper part of the beverage can.

3. The ultrasonic vibration applying device according to claim 2, wherein the annular fitted portion includes an upper end fitted portion having a projection that allows the projection to be fitted against a recess of the beverage can, the recess being recessed from an upper end of the beverage can toward an inner side of the beverage can.

4. The ultrasonic vibration applying device according to claim 1, wherein
the ultrasonic generator includes an ultrasonic generation device and an ultrasonic propagation member that is in contact with the ultrasonic generation device, and
the ultrasonic generator is configured such that the ultrasonic propagation member is held between the ultrasonic generation device and the side surface of the container by fitting the container and the fitted portion to each other.

5. The ultrasonic vibration applying device according to claim 1, wherein the ultrasonic generator is part of the fitted portion and is configured to be located on a lower side of the remaining section of the fitted portion with respect to the spout.

6. The ultrasonic vibration applying device according to claim 1, comprising:
a drive unit that generates a drive signal of an ultrasonic generation device incorporated in the ultrasonic generator; and
an operation part that receives an operation that instructs driving of the ultrasonic generation device, wherein
the drive unit and the operation part are located on an opposite side of a center of a ring of the fitted portion from the ultrasonic generator.

7. The ultrasonic vibration applying device according to claim 1, comprising:
a drive unit that generates a drive signal of an ultrasonic generation device incorporated in the ultrasonic generator; and
a power supply unit that supplies the drive unit with power, wherein
the power supply unit is located on an opposite side of a center of a ring of the fitted portion from the ultrasonic generator.

8. The ultrasonic vibration applying device according to claim 1, comprising:
a drive unit that generates a drive signal of an ultrasonic generation device incorporated in the ultrasonic generator; and
a power supply unit that supplies the drive unit with power, wherein
the power supply unit is configured to be arranged on an upper side of the container.

9. The ultrasonic vibration applying device according to claim 1, comprising:
a drive unit that generates a drive signal of an ultrasonic generation device incorporated in the ultrasonic generator;
a power supply unit that supplies the drive unit with power; and
an accommodation portion that accommodates the power supply unit, wherein
the accommodation portion is configured to extend downward from the fitted portion such that a position of a lower end of the accommodation portion coincides with a position of a lower end of the container in a vertical direction.

10. The ultrasonic vibration applying device according to claim 1, comprising:
a drive unit that generates a drive signal of an ultrasonic generation device incorporated in the ultrasonic generator;
a power supply unit that supplies the drive unit with power; and
an accommodation portion that accommodates the power supply unit, wherein
the accommodation portion is configured to extend downward from the fitted portion such that a length of the accommodation portion in the vertical direction is changeable.

11. The ultrasonic vibration applying device according to claim 1, wherein
the ultrasonic generator includes an ultrasonic generation device, and
the ultrasonic vibration applying device protects the ultrasonic generation device from entry of liquid.

12. The ultrasonic vibration applying device according to claim 1, wherein
the container is a beverage can, the beverage can including a body that has a fixed diameter and extends in a vertical direction, a diameter-decreasing part that decreases in diameter from the body toward an upper surface of the beverage can, and a boundary part between the body and the diameter-decreasing part,
the ultrasonic generator includes an ultrasonic generation device, and
the ultrasonic generation device is configured to overlap the boundary part as viewed in a sideward direction which opposes a surface of the body and in which the ultrasonic generation device is located frontward with the beverage can and the fitted portion fitted to each other.

13. The ultrasonic vibration applying device according to claim 12, wherein the ultrasonic generation device is configured to overlap the body and the boundary part as viewed in the sideward direction with the beverage can and the fitted portion fitted to each other.

14. The ultrasonic vibration applying device according to claim 12, wherein the ultrasonic generation device is further configured to overlap the diameter-decreasing part as viewed in the sideward direction with the beverage can and the fitted portion fitted to each other.

* * * * *